(12) United States Patent
Diamond et al.

(10) Patent No.: US 12,478,672 B2
(45) Date of Patent: *Nov. 25, 2025

(54) USE OF TRIPLEX CMV VACCINE IN CAR T CELL THERAPY

(71) Applicant: City of Hope, Duarte, CA (US)

(72) Inventors: Don J. Diamond, Duarte, CA (US); Xiuli Wang, Temple City, CA (US); Stephen J. Forman, Duarte, CA (US)

(73) Assignee: City of Hope, Duarte, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/354,849

(22) Filed: Jul. 19, 2023

(65) Prior Publication Data
US 2024/0016930 A1 Jan. 18, 2024

Related U.S. Application Data

(63) Continuation of application No. 17/572,496, filed on Jan. 10, 2022, now abandoned, which is a
(Continued)

(51) Int. Cl.
| | |
|---|---|
| A61K 39/395 | (2006.01) |
| A61K 39/00 | (2006.01) |
| A61K 39/12 | (2006.01) |
| A61K 39/245 | (2006.01) |
| A61K 39/285 | (2006.01) |
| A61K 40/11 | (2025.01) |
| A61K 40/31 | (2025.01) |
| A61K 40/42 | (2025.01) |
| A61K 40/46 | (2025.01) |
| A61P 31/20 | (2006.01) |
| A61P 35/00 | (2006.01) |
| C07K 14/00 | (2006.01) |
| C07K 14/005 | (2006.01) |
| C07K 14/705 | (2006.01) |
| C07K 14/725 | (2006.01) |
| C07K 14/73 | (2006.01) |
| C07K 16/28 | (2006.01) |
(Continued)

(52) U.S. Cl.
CPC ........ A61K 39/39558 (2013.01); A61K 39/12 (2013.01); A61K 39/245 (2013.01); A61K 39/285 (2013.01); A61K 40/11 (2025.01); A61K 40/31 (2025.01); A61K 40/4211 (2025.01); A61K 40/46 (2025.01); A61P 31/20 (2018.01); A61P 35/00 (2018.01); C07K 14/00 (2013.01); C07K 14/005 (2013.01); C07K 14/7051 (2013.01); C07K 14/70514 (2013.01); C07K 14/70517 (2013.01); C07K 14/70578 (2013.01); C07K 16/2803 (2013.01); C12N 5/0636 (2013.01); C12N 15/86 (2013.01); A61K 2039/5256 (2013.01); A61K 2039/585 (2013.01); C07K 2319/03 (2013.01); C07K 2319/33 (2013.01); C12N 2710/16122 (2013.01); C12N 2710/16134 (2013.01); C12N 2710/24134 (2013.01); C12N 2710/24143 (2013.01)

(58) Field of Classification Search
CPC .............. A61K 39/39558; A61K 39/12; A61K 39/245; A61K 39/285; A61K 40/11; A61K 40/31; A61K 40/4211; A61K 40/46; A61K 2039/5256; A61K 2039/585; A61P 31/20; A61P 35/00; C07K 14/00; C07K 14/005; C07K 14/7051; C07K 14/70514; C07K 14/70517; C07K 14/70578; C07K 16/2803; C07K 2319/03; C07K 2319/33; C12N 5/0636; C12N 15/86; C12N 2710/16122; C12N 2710/16134; C12N 2710/24134; C12N 2710/24143
See application file for complete search history.

(56) References Cited

U.S. PATENT DOCUMENTS

| 8,580,276 B2 | 11/2013 | Diamond et al. |
| 9,675,689 B2 | 6/2017 | Diamond et al. |

(Continued)

FOREIGN PATENT DOCUMENTS

| WO | WO 2015/142675 | 9/2015 |
| WO | WO 2016/154628 | 9/2016 |

(Continued)

OTHER PUBLICATIONS

Wang Z, Zhou W, Srivastava T, La Rosa C, Mandarino A, Forman SJ, Zaia JA, Britt WJ, Diamond DJ. A fusion protein of HCMV IE1 exon4 and IE2 exon5 stimulates potent cellular immunity in an MVA vaccine vector. Virology. Aug. 1, 2008;377(2):379-90. doi: 10.1016/j.virol.2008.04.034. Epub Jun. 5, 2008. (Year: 2008).*

(Continued)

Primary Examiner — Rachel B Gill
(74) Attorney, Agent, or Firm — Fish & Richardson P.C.

(57) ABSTRACT

A method for treating a patient comprising: (a) providing a composition comprising a population of T cells expressing both a chimeric antigen receptor (CAR) and a T cell receptor specific for a cytomegalovirus (CMV) antigen; (b) administering the composition to the patient; and (c) administering to the patient a viral vector encoding: (i) CMV pp65 and (ii) a fusion protein comprising exon 4 of CMV protein IE1 (e4) and exon 5 of CMV protein IE2 (e5) either prior to or subsequent to administering the composition comprising a population of T cells to the patient is described.

10 Claims, 14 Drawing Sheets
Specification includes a Sequence Listing.

Related U.S. Application Data continuation of application No. 17/006,758, filed on Aug. 28, 2020, now abandoned, which is a continuation of application No. 16/343,701, filed as application No. PCT/US2017/057433 on Oct. 19, 2017, now abandoned.

(60) Provisional application No. 62/410,372, filed on Oct. 19, 2016.

(51) Int. Cl.
*C12N 5/0783* (2010.01)
*C12N 15/86* (2006.01)

(56) References Cited

U.S. PATENT DOCUMENTS

| | | | |
|---|---|---|---|
| 10,603,375 | B2 | 3/2020 | Diamond et al. |
| 11,116,834 | B2 | 9/2021 | Williams et al. |
| 2010/0316667 | A1 | 12/2010 | Diamond et al. |
| 2019/0247500 | A1 | 8/2019 | Diamond et al. |
| 2020/0316193 | A1 | 10/2020 | Diamond et al. |
| 2021/0062221 | A1 | 3/2021 | Wussow et al. |
| 2021/0113691 | A1 | 4/2021 | Diamond et al. |
| 2021/0386840 | A1 | 12/2021 | Wang et al. |
| 2022/0378911 | A1 | 12/2022 | Diamond et al. |

FOREIGN PATENT DOCUMENTS

| | | |
|---|---|---|
| WO | WO 2018/075813 | 4/2018 |
| WO | WO 2019/084018 | 5/2019 |

OTHER PUBLICATIONS

Yoon Calvelo V. "Chimeric Antigen Receptors and T cells—CAR-T." https://www.rapidnovor.com/chimeric-antigen-receptors-and-t-cells-car-t/. RapidNovor. Jun. 13, 2022. (Year: 2022).*
Zeppa P, Marino G, Troncone G, Fulciniti F, De Renzo A, Picardi M, et al. Fine-needle cytology and flow cytometry immunophenotyping and subclassification of non-Hodgkin lymphoma: a critical review of 307 cases with technical suggestions. Cancer. Feb. 25, 2004;102(1):55-65. (Year: 2004).*
Craig FE, Foon KA. Flow cytometric immunophenotyping for hematologic neoplasms. Blood. Apr. 15, 2008;111(8):3941-67. Epub Jan. 15, 2008. (Year: 2008).*
Wang K, Wei G, Liu D. CD19: a biomarker for B cell development, lymphoma diagnosis and therapy. Exp Hematol Oncol. Nov. 29, 2012;1(1):36. (Year: 2012).*
Rizzo K, Stetler-Stevenson M, Wilson W, Yuan CM. Novel CD19 expression in a peripheral T cell lymphoma: A flow cytometry case report with morphologic correlation. Cytometry B Clin Cytom. Mar. 2009;76(2):142-9. (Year: 2009).*
Levstek L, Janžič L, Ihan A, Kopitar AN. Biomarkers for prediction of CAR T therapy outcomes: current and future perspectives. Front Immunol. Mar. 15, 2024;15:1378944. (Year: 2024).*
Wang V, Gauthier M, Decot V, Reppel L, Bensoussan D. Systematic Review on CAR-T Cell Clinical Trials up to 2022: Academic Center Input. Cancers (Basel). Feb. 4, 2023;15(4):1003. (Year: 2023).*
City of Hope Medical Center. Memory Enriched T Cells Following Stem Cell Transplant in Treating Patients With Recurrent B-Cell Non-Hodgkin Lymphoma. Clinical Trials ID: NCT02051257. First submitted Jan. 29, 2014. (Year: 2014).*
City of Hope Medical Center. Genetically Modified T-cells (CMV-Specific CD19-CAR T-cells) Plus a Vaccine (CMV-MVA Triplex) Following Stem Cell Transplantation for the Treatment of Intermediate or High Grade B-cell Non-Hodgkin Lymphoma. Clinical Trials ID: NCT05432635. First submitted Jun. 21, 2022. (Year: 2022).*
City of Hope Medical Center. Genetically Modified T-cells (CMV-Specific CD19-CAR T-cells) Plus a Vaccine (CMV-MVA Triplex) for the Treatment of Intermediate or High Grade B-Cell Non-Hodgkin Lymphoma. Clinical Trials ID: NCT05801913. First submitted Mar. 24, 2023. (Year: 2023).*
Anonymous, "Multi-antigen CMV-MVA Triplex Vaccine in Reducing CMV Complications in Patients Previously Infected With CMV and Hematopoietic Cell Transplant," Aug. 3, 2016 [retrieved on Mar. 13, 2020], retrieved from URL <https://clinicaltrials.gov/ct2/history/NCT02506933?V_9=View#StudyPageTop>, 6 pages.
Anonymous, "MVA vaccine encoding CMV antigens safely induces durable expansion of CMV-specific T cells in healthy adults," Jan. 5, 2017 [retrieved on Mar. 13, 2020], retrieved from URL <https://www.ncbi.nlm.nih.gov/pmc/articles/PMC5216266/?report-printable>, 13 pages.
Anonymous, "Safety, Maximum Tolerated Dose and Immunogenicity of CMV-MVA-Triplex in Healthy Volunteers with or without Prior Immunity to CMV and Vaccinia," Dec. 5, 2015 [retrieved on Mar. 13, 2020], retrieved from URL<https://ash.confex.com/ash/2015/webprogramscheduler/Paper81450.html>, 2 pages.
Caruana et al., "K562-Derived Whole-Cell Vaccine Enhances Antitumor Responses of CAR-Redirected Virus-Specific Cytotoxic T Lymphocytes In Vivo," Clin Cancer Res., Jul. 1, 2015, 21(13):2952-2962.
Diamond et al., "3108 Safety, Maximum Tolerated Dose and Immunogenicity of CMV-MVA-Triplex in Healthy Volunteers with or without Prior Immunity to CMV and Vaccinia," Presented at the 57th Annual ASH Meeting & Exposition, Dec. 5-8, 2015, Orlando, FL, 2 pages.
European Extended Search Report in European Application No. 17862405.2, dated Apr. 17, 2020, 16 pages.
European Extended Search Report in European Application No. 17862405.2, Feb. 24, 2021, 14 pages.
International Preliminary Report and Written Opinion in International Application No. PCT/US2017/57433, dated Apr. 23, 2019, 11 pages.
International Search Report and Written Opinion in International Application No. PCT/US2017/57433, dated Mar. 5, 2018, 15 pages.
Peters and Sette, "Integrating epitope data into the emerging web of biomedical knowledge resources," Nature Reviews Immunology, 2007, 7:485-490.
Schleiss, "Cytomegalovirus vaccines under clinical development," Journal of Virus Eradication, Oct. 5, 2016, 2:198-207.
Sylwester et al., "Broadly targeted human cytomegalovirus-specific CD4+ and CD8+ T cells dominate the memory compartments of exposed subjects," J Exp Med., 2005, 202(5):673-685.
Wang et al., "CMVpp65 Vaccine Enhances the Antitumor Efficacy of Adoptively Transferred CD19-Redirected CMV-Specific T Cells," Clin Cancer Res., Jul. 1, 2015, 21(13):2993-3002.
Wang et al., "Modified H5 promoter improves stability of insert genes while maintaining immunogenicity during extended passage of genetically engineered MVA vaccines," Vaccine, Feb. 10, 2010, 28(6):1547-1557.
Wang et al., "Phase 1 studies of central memory-derived CD19 CAR T-cell therapy following autologous HSCT in patients with B-cell NHL," Blood, 2016, 127(24):2980-2990.
Wang et al., "Pre-Clinical Development of a Subunit Vaccine Expressing an 1E1-1E2 Fusion Protein of HCMV," Blood, Nov. 16, 2007, 110(11):165.

* cited by examiner

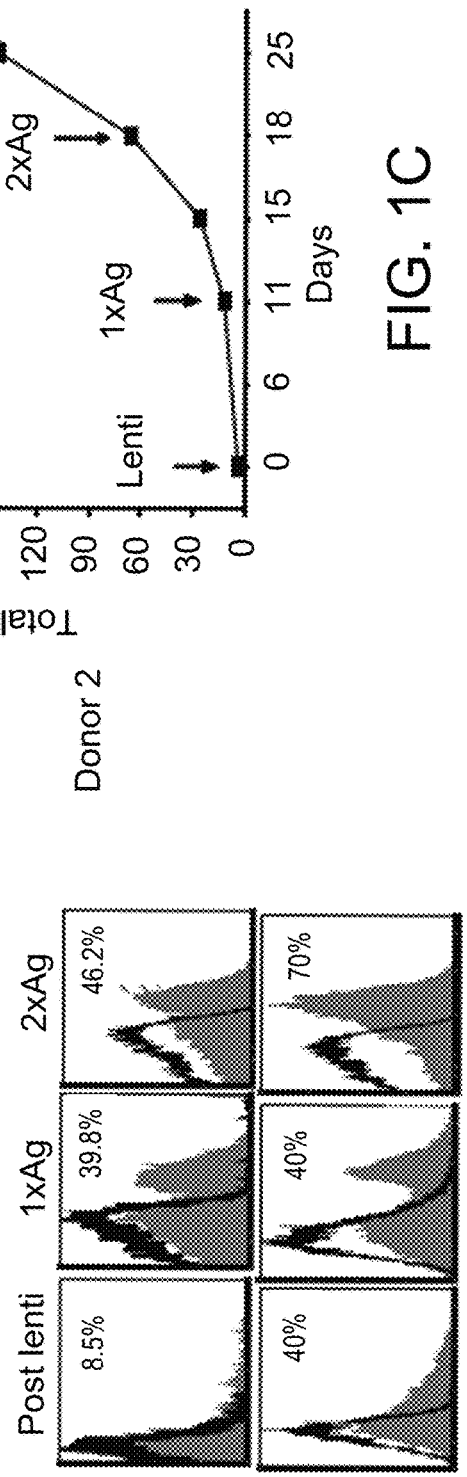
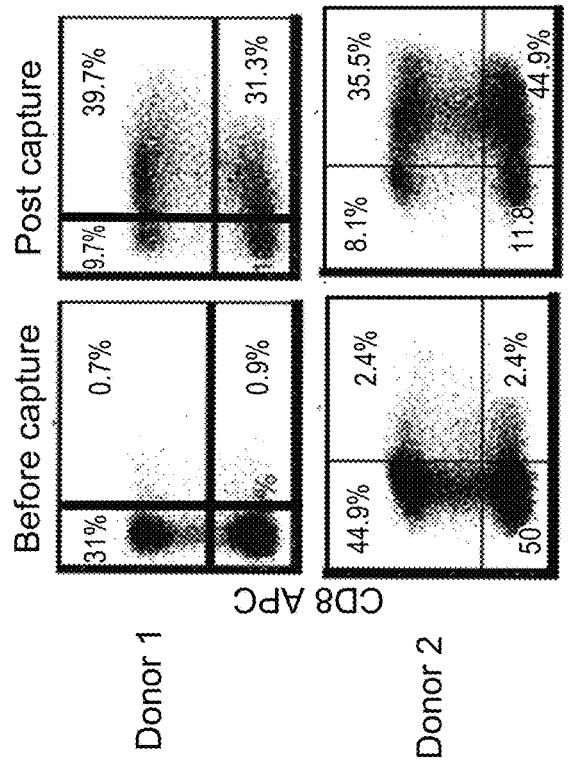
FIG. 1A
FIG. 1B
FIG. 1C

| Healthy Donor | IFNγ+ Cells Prior to Capture | IFNγ+ Cells Post Capture | IFNγ+ CD8 | IFNγ+ CD4 | %yield from PBMC |
|---|---|---|---|---|---|
| Donor 1 | 1.8% | 71% | 40% | 31% | 0.2 |
| Donor 1 | 3.7% | 61% | 33% | 28% | 0.3 |
| Donor 1 | 3.2% | 76% | 40% | 36% | 0.2 |
| Donor 2 | 4.8% | 81% | 36% | 45% | 0.4 |
| Donor 3 | 5.6% | 70% | 21% | 49% | 0.1 |
| Mean ± SEM | 3.8 ± 0.7% | 71.8 ± 3.3% | 34.5 ± 3.5% | 37.0 ± 4.0% | 0.24 ± 0.05% |

FIG. 1D

FIG. 3A mH5-IEfusion-pZWIIA (GUS) plasmid DNA sequence (SEQ ID NO : A)

```
   1 CCTCCTGAAA AACTGGAATT TAATACACCA TTTGTGTTCA TCATCAGACA TGATATTACT
  61 GGATTTATAT TGTTTATGGG TAAGGTAGAA TCTCCTTAAT ATGGGTACGG TGTAAGGAAT
 121 CATTATTTTA TTTATATTGA TGGGTACGTG AAATCTGAAT TTTCTTAATA AATATTATTT
 181 TTATTAAATG TGTATATGTT GTTTTGCGAT AGCCATGTAT CTACTAATCA GATCTATTAG
 241 AGATATTATT AATTCTGGTG CAATATGACA AAAATTATAC ACTAATTAGC GTCTCGTTTC
 301 AGACATGGAT CTGTCACGAA TTAATACTTG GAAGTCTAAG CAGCTGAAAA GCTTTCTCTC
 361 TAGCAAAGAT GCATTTAAGG CGGATGTCCA TGGACATAGT GCCTTGTATT ATGCAATAGC
 421 TGATAATAAC GTGCGTCTAG TATGTACGTT GTTGAACGCT GGAGCATTGA AAAATCTTCT
 481 AGAGAATGAA TTTCCATTAC ATCAGGCAGC CACATTGGAA GATACCAAAA TAGTAAAGAT
 541 TTTGGCTATT CAGTGGACTG GATGATTCGA GGTACCGACT ATTGTTCTAT ATTATATATG
 601 GTTGTTGATG GATCTGTGAT GCATGCAATA GCTGATAATA GAACTTACGC AAATATTAGC
 661 AAAAATATAT TAGACAATAC TACAATTAAC GATGAGTGTA GATGCTGTTA TTTTGAACCA
 721 CAGATTAGGA TTCTTGATAG AGATGAGATG CTCAATGGAT CATCGTGTGA TATGAACAGA
 781 CATTGTATTA TGATGAATTT ACCTGATGTA GGCGAATTTG GATCTAGTAT GTTGGGGAAA
 841 TATGAACCTG ACATGATTAA GATTGCTCTT TCGGTGGCTG GGTACCAGGC GCGCATTTCA
 901 TTTTGTTTTT TTCTATGCTA TAAATGGTAC GTCCTGTAGA AACCCCAACC CGTGAAATCA
 961 AAAAACTCGA CGGCCTGTGG GCATTCAGTC TGGATCGCGA AAACTGTGGA ATTGATCAGC
1021 GTTGGTGGGA AAGCGCGTTA CAAGAAAGCC GGGCAATTGC TGTGCCAGGC AGTTTTAACG
1081 ATCAGTTCGC CGATGCAGAT ATTCGTAATT ATGCGGGCAA CGTCTGGTAT CAGCGCGAAG
1141 TCTTTATACC GAAAGGTTGG GCAGGCCAGC GTATCGTGCT GCGTTTCGAT GCGGTCACTC
1201 ATTACGGCAA AGTGTGGGTC AATAATCAGG AAGTGATGGA GCATCAGGGC GGCTATACGC
1261 CATTTGAAGC CGATGTCACG CCGTATGTTA TTGCCGGGAA AAGTGTACGT ATCACCGTTT
1321 GTGTGAACAA CGAACTGAAC TGGCAGACTA TCCCGCCGGG AATGGTGATT ACCGACGAAA
1381 ACGGCAAGAA AAAGCAGTCT TACTTCCATG ATTTCTTTAA CTATGCCGGA ATCCATCGCA
1441 GCGTAATGCT CTACACCACG CCGAACACCT GGGTTGGACGA TATCACCGTG TGACGCATG
1501 TCGCGCAAGA CTGTAACCAC GCGTCTGTTG ACTGGCAGGT GGTGGCCAAT GGTGATGTCA
1561 GCGTTGAACT GCGTGATGCG GATCAACAGG TGGTTGCAAC TGGACAAGGC ACTAGCGGGA
1621 CTTTGCAAGT GGTGAATCCG CACCTCTGGC AACCGGGTGA AGGTTATCTC TATGAACTGT
1681 GCGTCACAGC CAAAAGCCAG ACAGAGTGTG ATATCTACCC GCTTCGCGTC GGCATCCGGT
1741 CAGTGGCAGT GAAGGGCGAA CAGTTCCTGA TTAACCACAA ACCGTTCTAC TTTACTGGCT
1801 TTGGTCGTCA TGAAGATGCG GACTTGCGTG GCAAAGGATT CGATAACGTG CTGATGGTGC
1861 ACGACCACGC ATTAATGGAC TGGATTGGGG CCAACTCCTA CCGTACCTCG CATTACCCTT
1921 ACGCTGAAGA GATGCTCGAC TGGGCAGATG AACATGGCAT CGTGGTGATT GATGAAACTG
1981 CTGCTGTCGG CTTTAACCTC TCTTTAGGCA TTGGTTTCGA AGCGGGCAAC AAGCCGAAAG
2041 AACTGTACAG CGAAGAGGCA GTCAACGGGG AAACTCAGCA AGCGCACTTA CAGGCGATTA
2101 AAGAGCTGAT AGCGCGTGAC AAAAACCACC CAAGCGTGGT GATGTGGAGT ATTGCCAACG
2161 AACCGGATAC CCGTCCGCAA GGTGCACGGG AATATTTCGC GCCACTGGCG GAAGCAACGC
2221 GTAAACTCGA CCCGACGCGT CCGATCACCT GCGTCAATGT AATGTTCTGC GACGCTCACA
2281 CCGATACCAT CAGCGATCTC TTTGATGTGC TGTGCCTGAA CCGTTATTAC GGATGGTATG
2341 TCCAAAGCGG CGATTTGGAA ACGGCAGAGA AGGTACTGGA AAAAGAACTT CTGGCCTGGC
2401 AGGAGAAACT GCATCAGCCG ATTATCATCA CCGAATACGG CGTGGATACG TTAGCCGGGC
2461 TGCACTCAAT GTACACCGAC ATGTGGAGTG AAGAGTATCA GTGTGCATGG CTGGATATGT
2521 ATCACCGCGT CTTTGATCGC GTCAGCGCCG TCGTCGGTGA ACAGGTATGG AATTTCGCCG
2581 ATTTTGCGAC CTCGCAAGGC ATATTGCGCG TTGGCGGTAA CAAGAAAGGG ATCTTCACTC
2641 GCGACCGCAA ACCGAAGTCG GCGGCTTTTC TGCTGCAAAA ACGCTGGACT GGCATGAACT
2701 TCGGTGAAAA ACCGCAGCAG GGAGGCAAAC AATGAGAGCT CGGTTGTTGA TGGATCTGTG
2761 ATGCATGCAA TAGCTGATAA TAGAACTTAC GCAAATATTA GCAAAAATAT ATTAGACAAT
2821 ACTACAATTA ACGATGAGTG TAGATGCTGT TATTTTGAAC CACAGATTAG GATTCTTGAT
2881 AGAGATGAGA TGCTCAATGG ATCATCGTGT GATATGAACA GACATTGTAT TATGATGAAT
2941 TTACCTGATG TAGGCGAATT TGGATCTAGT ATGTTGGGGA AATATGAACC TGACATGATT
3001 AAGATTGCTC TTTCGGTGGC TGGCGGCCCG CTCGAGAAAA ATTGAAAATA AATACAAAGG
3061 TTCTTGAGGG TTGTGTTAAA TTGAAAGCGA GAAATAATCA TAAATAAGCC ACCACCGTTT
3121 AAACGCCACC ACAATGGTCA AACAGATTAA GGTTCGAGTG GACATGGTGC GGCATAGAAT
3181 CAAGGCGCAC ATGCTGAAAA AATATACCCA GACGGAAGAG AAATTCACTG GCGCCTTTAA
3241 TATGATGGGA GGATGTTTGC AGAATGCCTT AGATATCTTA GATAAGGTTC ATGAGCCTTT
3301 CGAGGAGATG AAGTGTATTG GGCTAACTAT GCAGAGCATG TATGAGAACT ACATTGTACC
3361 TGAGGATAAG CGGGAGATGT GGATGGCTTG TATTAAGGAG CTGCATGATG TGAGCAAGGG
3421 CGCCGCTAAC AAGTTGGGGG GTGCACTGCA GGCTAAGGCC CGTGCTAAAA AGGATGAACT
3481 TAGGAGAAAG ATGATGTATA TGTGCTACAG GAATATAGAG TTCTTTACCA AGAACTCAGC
3541 CTTCCCTAAG ACCACCAATG GCTGCAGTCA GGCCATGGCG GCACTGCAGA ACTTGCCTCA
3601 GTGCTCCCCT GATGAGATTA TGGCTTATGC CCAGAAAATA TTTAAGATTT GGATGAGGA
3661 GAGAGACAAG GTGCTCACGC ACATTGATCA CATATTTATG GATATCCTCA CTACATGTGT
```

```
3721 GGAAACAATG TGTAATGAGT ACAAGGTCAC TAGTGACGCT TGTATGATGA CCATGTACGG
3781 GGGCATCTCT CTCTTAAGTG AGTTCTGTCG GGTGCTGTGC TGCTATGTCT TAGAGGAGAC
3841 TAGTGTGATG CTGGCCAAGC GGCCTCTGAT AACCAAGCCT GAGGTTATCA GTGTAATGAA
3901 GCGCCGCATT GAGGAGATCT GCATGAAGGT CTTTGCCCAG TACATTCTGG GGGCCGATCC
3961 TCTGAGAGTC TGCTCTCCTA GTGTGGATGA CCTACGGGCC ATCGCCGAGG AGTCAGATGA
4021 GGAAGAGGCT ATTGTAGCCT ACACTTTGGC CACCGCTGGT GTCAGCTCCT CTGATTCTCT
4081 GGTGTCACCC CCAGAGTCCC CTGTACCCGC GACTATCCCT CTGTCCTCAG TAATTGTGGC
4141 TGAGAACAGT GATCAGGAAG AAAGTGAGCA GAGTGATGAG GAAGAGGAGG AGGGTGCTCA
4201 GGAGGAGCGG GAGGACACTG TGTCTGTCAA GTCTGAGCCA GTGTCTGAGA TAGAGGAAGT
4261 TGCCCCAGAG GAAGAGGAGG ATGGTGCTGA GGAACCCACC GCCTCTGGAG GCAAGAGCAC
4321 CCACCCTATG GTGACTAGAA GCAAGGCTGA CCAGGGTGAC ATCCTCGCCC AGGCTGTCAA
4381 TCATGCCGGT ATCGATTCCA GTAGCACCGG CCCCACGCTG ACAACCCACT CTTGCAGCGT
4441 TAGCAGCGCC CCTCTTAACA AGCCGACCCC CACCAGCGTC GCGGTTACTA ACACTCCTCT
4501 CCCCGGGGCA TCCGCTACTC CCGAGCTCAG CCCGCGTAAG AAACCGCGCA AACCACGCG
4561 TCCTTTCAAG GTGATTATTA AACCGCCCGT GCCTCCCGCG CCTATCATGC TGCCCCTCAT
4621 CAAACAGGAA GACATCAAGC CCGAGCCCGA CTTTACCATC CAGTACCGCA ACAAGATTAT
4681 CGATACCGCC GGCTGTATCG TGATCTCTGA TAGCGAGGAA GAACAGGGTG AAGAAGTCGA
4741 AACCCGCGGT GCTACCGCGT CTTCCCCTTC CACCGGCAGC GGCACGCCGC GAGTGACCTC
4801 TCCCACGCAC CCGCTCTCCC AGATGAACCA CCCTCCTCTT CCCGATCCCT TGGGCCGGCC
4861 CGATGAAGAT AGTTCCTCTT CGTCTTCCTC CTCCTGCAGT TCGGCTTCGG ACTCGGAGAG
4921 TGAGTCCGAG GAGATGAAAT GCAGCAGTGG CGGAGGAGCA TCCGTGACCT CGAGCCACCA
4981 TGGGCGCGGC GGTTTTGGTG GCGCGGCCTC CTCCTCTCTG CTGAGCTGCG GCCATCAGAG
5041 CAGCGGCGGG GCGAGCACCG GACCCCGCAA GAAGAAGAGC AAACGCATCT CCGAGTTGGA
5101 CAACGAGAAG GTGCGCAATA TCATGAAAGA TAAGAACACC CCCTTCTGCA CACCCAACGT
5161 GCAGACTCGG CGGGGTCGCG TCAAGATTGA CGAGGTGAGC CGCATGTTCC GCAACACCAA
5221 TCGCTCTCTT GAGTACAAGA ACCTGCCCTT CACGATTCCC AGTATGCACC AGGTGTTAGA
5281 TGAGGCCATC AAAGCCTGCA AAACCATGCA GGTGAACAAC AAGGGCATCC AGATTATCTA
5341 CACCCGCAAT CATGAGGTGA AGAGTGAGGT GGATGCGGTG CGGTGTCGCC TGGGCACCAT
5401 GTGCAACCTG GCCCTCTCCA CTCCCTTCCT CATGGAGCAC ACCATGCCCG TGACACATCC
5461 ACCCGAAGTG GCGCAGCGCA CAGCCGATGC TTGTAACGAA GGCGTCAAGG CCGCGTGGAG
5521 CCTCAAAGAA TTGCACACCC ACCAATTATG CCCCGTTCC TCCGATTACC GCAACATGAT
5581 CATCCACGCT GCCACCCCCG TGGACCTGTT GGGCGCTCTC AACCTGTGCC TGCCCCTGAT
5641 GCAAAAGTTT CCCAAACAGG TCATGGTGCG CATCTTCTCC ACCAACCAGG GTGGGTTCAT
5701 GCTGCCTATC TACGAGACGG CCGCGAAGGC CTACGCCGTG GGGCAGTTTG AGCAGCCCAC
5761 CGAGACCCCT CCCGAAGACC TGGACACCCT GAGCCTGGCC ATCGAGGCAG CCATCCAGGA
5821 CCTGAGGAAC AAGTCTCAGT AAAATAAAGG CGCGCCATAA AAATTTTTAT ACTAGTGTAC
5881 CGCGGTCGAA TCGATTTAAT TAACGATGCT AGCATTGTCG ACGGTGGTGG CGCGGCCGCC
5941 AGTGTGATGG ATATCTGCAG AATTCGGCTT GGGGGGCTGC AGGTGGATGC GATCATGACG
6001 TCCTCTGCAA TGGATAACAA TGAACCTAAA GTACTAGAAA TGGTATATGA TGCTACAATT
6061 TTACCCGAAG GTAGTAGCAT GGATTGTATA ACAGACACA TCAATATGTG TATACAACGC
6121 ACCTATAGTT CTAGTATAAT TGCCATATTG GATAGATTCC TAATGATGAA CAAGGATGAA
6181 CTAAATAATA CACAGTGTCA TATAATTAAA GAATTTATGA CATACGAACA AATGGCGATT
6241 GACCATTATG GAGAATATGT AAACGCTATT CTATATCAAA TTCGTAAAAG ACCTAATCAA
6301 CATCACACCA TTAATCTGTT TAAAAAATA AAAAGAACCC GGTATGACAC TTTTAAAGTG
6361 GATCCCGTAG AATTCGTAAA AAAGTTATC GGATTTGTAT CTATCTTGAA CAAATATAAA
6421 CCGGTTTATA GTTACGTCCT GTACGAGAAC GTCCTGTACG ATGATGTCAA ATGTTTCATT
6481 GACTACGTGG AAACTAAGTA TTTCTAAAAT TAATGATGCA TTAATTTTTG TATTGATTCT
6541 CAATCCTAAA AACTAAAATA TGAATAAGTA TTAAACATAG CGGTGTACTA ATTGATTTAA
6601 CATAAAAAAT AGTTGTTAAC TAATCATGAG GACTCTACTT ATTAGATATA TTCTTTGGAG
6661 AAATGACAAC GATCAAACCG GGCATGCAAG CTTGTCTCCC TATAGTGAGT CGTATTAGAG
6721 CTTGGCGTAA TCATGGTCAT AGCTGTTTCC TGTGTGAAAT TGTTATCCGC TCACAATTCC
6781 ACACAACATA CGAGCCGGAA GCATAAAGTG TAAAGCCTGG GGTGCCTAAT GAGTGAGCTA
6841 ACTCACATTA ATTGCGTTGC GCTCACTGCC CGCTTTCGAG TCGGGAAACC TGTCGTGCCA
6901 GCTGCATTAA TGAATCGGCC AACGCGCGGG GAGAGGCGGT TTGCGTATTG GGCGCTCTTC
6961 CGCTTCCTCG CTCACTGACT CGCTGCGCTC GGTCGTTCGG CTGCGGCGAG CGGTATCAGC
7021 TCACTCAAAG GCGGTAATAC GGTTATCCAC AGAATCAGGG GATAACGCAG GAAAGAACAT
7081 GTGAGCAAAA GGCCAGCAAA AGGCCAGGAA CCGTAAAAAG GCCGCGTTGC TGGCGTTTTT
7141 CGATAGGCTC CGCCCCCCTG ACGAGCATCA CAAAAATCGA CGCTCAAGTC AGAGGTGGCG
7201 AAACCCGACA GGACTATAAA GATACCAGGC GTTTCCCCCT GGAAGCTCCC TCGTGCGCTC
7261 TCCTGTTCCG ACCCTGCCGC TTACCGGATA CCTGTCCGCC TTTCTCCCTT CGGGAAGCGT
7321 GGCGCTTTCT CATAGCTCAC GCTGTAGGTA TCTCAGTTCG GTGTAGGTCG TTCGCTCCAA
7381 GCTGGGCTGT GTGCACGAAC CCCCCGTTCA GCCCGACCGC TGCGCCTTAT CCGGTAACTA
7441 TCGTCTTGAG TCCAACCCGG TAAGACACGA CTTATCGCCA CTGGCAGCAG CCACTGGTAA
7501 CAGGATTAGC AGAGCGAGGT ATGTAGGCGG TGCTACAGAG TTCTTGAAGT GGTGGCCTAA
7561 CTACGGCTAC ACTAGAAGGA CAGTATTTGG TATCTGCGCT CTGCTGAAGC CAGTTACCTT
7621 CGGAAAAAGA GTTGGTAGCT CTTGATCCGG CAAACAAACC ACCGCTGGTA GCGGTGGTTT
7681 TTTTGTTTGC AAGCAGCAGA TTACGCGCAG AAAAAAAGGA TCTCAAGAAG ATCCTTTGAT
7741 CTTTTCTACG GGGTCTGACG CTCAGTGGAA CGAAAACTCA CGTTAAGGGA TTTTGGTCAT
```

FIG. 3B

```
7801 GAGATTATCA AAAAGGATCT TCACCTAGAT CCTTTTAAAT TAAAAATGAA GTTTTAAATC
7861 AATCTAAAGT ATATATGAGT AAACTTGGTC TGACAGTTAC CAATGCTTAA TCAGTGAGGC
7921 ACCTATCTCA GCGATCTGTC TATTTCGTTC ATCCATAGTT GCCTGACTCC CCGTCGTGTA
7981 GATAACTACG ATACGGGAGG GCTTACCATC TGGCCCCAGT GCTGCAATGA TACCGCGAGA
8041 CCCACGCTCA CCGGCTCCAG ATTTATCAGC AATAAACCAG CCAGCCGGAA GGGCCGAGCG
8101 CAGAAGTGGT CCTGCAACTT TATCCGCCTC CATCCAGTCT ATTAATTGTT GCCGGGAAGC
8161 TAGAGTAAGT AGTTCGCCAG TTAATAGTTT GCGCAACGTT GTTGGCATTG CTACAGGCAT
8221 CGTGGTGTCA CGCTCGTCGT TTGGTATGGC TTCATTCAGC TCCGGTTCCC AACGATCAAG
8281 GCGAGTTACA TGATCCCCCA TGTTGTGCAA AAAAGCGGTT AGCTCCTTCG GTCCTCCGAT
8341 CGTTGTCAGA AGTAAGTTGG CCGCAGTGTT ATCACTCATG GTTATGGCAG CACTGCATAA
8401 TTCTCTTACT GTCATGCCAT CCGTAAGATG CTTTTCTGTG ACTGGTGAGT ACTCAACCAA
8461 GTCATTCTGA GAATAGTGTA TGCGGCGACC GAGTTGCTCT TGCCCGGCGT CAATACGGGA
8521 TAATACCGCG CCACATAGCA GAACTTTAAA AGTGCTCATC ATTGGAAAAC GTTCTTCGGG
8581 GCGAAAACTC TCAAGGATCT TACCGCTGTT GAGATCCAGT TCGATGTAAC CCACTCGTGC
8641 ACCCAACTGA TCTTCAGCAT CTTTTACTTT CACCAGCGTT TCTGGGTGAG CAAAAACAGG
8701 AAGGCAAAAT GCCGCAAAAA AGGGAATAAG GGCGACACGG AAATGTTGAA TACTCATACT
8761 CTTCCTTTTT CAATATTATT GAAGCATTTA TCAGGGTTAT TGTCTCATGA GCGGATACAT
8821 ATTTGAATGT ATTTAGAAAA ATAAACAAAT AGGGGTTCCG CGCACATTTC CCCGAAAAGT
8881 GCCACCTGAC GTCTAAGAAA CCATTATTAT CATGACATTA ACCTATAAAA ATAGGCGTAT
8941 CACGAGGCCC TTTCGTCTCG CGCGTTTCGG TGATGACGGT GAAAACCTCT GACACATGCA
9001 GCTCCCGGAG ACGGTCACAG CTTGTCTGTA AGCGGATGCC GGGAGCAGAC AAGCCCGTCA
9061 GGGCGCGTCA GCGGGTGTTG GCGGGTGTCG GGCTGGCTT AACTATGCGG CATCAGAGCA
9121 GATTGTACTG AGAGTGCACC ATATGCGGTG TGAAATACCG CACAGATGCG TAAGGAGAAA
9181 ATACCGCATC AGGCGCCATT CGCCATTCAG GCTGCGCAAC TGTTGGGAAG GGCGATCGGT
9241 GCGGGCCTCT TCGCTATTAC GCCAGCTGGC GAAAGGGGGA TGTGCTGCAA GGCGATTAAG
9301 TTGGGTAACG CCAGGGTTTT CCCAGTCACG ACGTTGTAAA ACGACGGCCA GTGAATTGGA
9361 TTTAGGTGAC ACTATAGAAT ACGAATTC
```

FIG. 3C

FIG. 4A mH5-pp65-pLW51(GUS) plasmid DNA sequence (SEQ ID NO :B)

```
   1  GAATTCGTTG GTGGTCGCCA TGGATGGTGT TATTGTATAC TGTCTAAACG CGTTAGTAAA
  61  ACATGGCGAG GAAATAAATC ATATAAAAAA TGATTTCATG ATTAAACCAT GTTGTGAAAA
 121  AGTCAAGAAC GTTCACATTG GCGGACAATC TAAAACAAT ACAGTGATTG CAGATTTGCC
 181  ATATATGGAT AATGCGGTAT CCGATGTATG CAATTCACTG TATAAAAGA ATGTATCAAG
 241  AATATCCAGA TTTGCTAATT TGATAAAGAT AGATGACGAT GACAAGACTC CTACTGGTGT
 301  ATATAATTAT TTTAAACCTA AAGATGCCAT TCCTGTTATT ATATCCATAG GAAAGGATAG
 361  AGATGTTTGT GAACTATTAA TCTCATCTGA TAAAGCGTGT GCGTGTATAG AGTTAAATTC
 421  ATATAAAGTA GCCATTCTTC CCATGGATGT TTCCTTTTTT ACCAAAGGAA ATGCATCATT
 481  GATTATTCTC CTGTTTGATT TCTCTATCGA TGCGGCACCT CTCTTAAGAA GTGTAACCGA
 541  TAATAATGTT ATTATATCTA GACACCAGCG TCTACATGAC GAGCTTCCGA GTTCCAATTG
 601  GTTCAAGTTT TACATAAGTA TAAAGTCCGA CTATTGTTCT ATATTATA TGGTTGTTGA
 661  TGGATCTGTG ATGCATGCAA TAGCTGATAA TAGAACTTAC GCAAATATTA GCAAAAATAT
 721  ATTAGACAAT ACTACAATTA ACGATGAGTG TAGATGCTGT TATTTTGAAC CACAGATTAG
 781  GATTCTTGAT AGAGATGAGA TGCTCAATGG ATCATCGTGT GATATGAACA GACATTGTAT
 841  TATGATGAAT TTACCTGATG TAGGCGAATT TGGATCTAGT ATGTTGGGGA AATATGAACC
 901  TGACATGATT AAGATTGCTC TTTCGGTGGC TGGGTACCAG GCGCGCATTT CATTTGTTT
 961  TTTTCTATGC TATAAATGGT ACGTCCTGTA GAAACCCCAA CCCGTGAAAT CAAAAAACTC
1021  GACGGCCTGT GGGCATTCAG TCTGGATCGC GAAAACTGTG GAATTGATCA GCGTTGGTGG
1081  GAAAGCGCGT TACAAGAAAG CCGGGCAATT GCTGTGCCAG GCAGTTTTAA CGATCAGTTC
1141  GCCGATGCAG ATATTCGTAA TTATGCGGGC AACGTCTGGT ATCAGCGCGA AGTCTTTATA
1201  CCGAAAGGTT GGGCAGGCCA GCGTATCGTG CTGCGTTTCG ATGCGGTCAC TCATTACGGC
1261  AAAGTGTGGG TCAATAATCA GGAAGTGATG GAGCATCAGG GCGGCTATAC GCCATTTGAA
1321  GCCGATGTCA CGCCGTATGT TATTGCCGGG AAAAGTGTAC GTATCACCGT TTGTGTGAAC
1381  AACGAACTGA ACTGGCAGAC TATCCCGCCG GGAATGGTGA TTACCGACGA AAACGGCAAG
1441  AAAAAGCAGT CTTACTTCCA TGATTTCTTT AACTATGCCG GAATCCATCG CAGCGTAATG
1501  CTCTACACCA CGCCGAACAC CTGGGTGGAC GATATCACCG TGGTGACGCA TGTCGCGCAA
1561  GACTGTAACC ACGCGTCTGT TGACTGGCAG GTGGTGGCCA ATGGTGATGT CAGCGTTGAA
1621  CTGCGTGATG CGGATCAACA GGTGGTTGCA ACTGGACAAG GCACTAGCGG GACTTTGCAA
1681  GTGGTGAATC CGCACCTCTG GCAACCGGGT GAAGGTTATC TCTATGAACT GTGCGTCACA
1741  GCCAAAAGCC AGACAGAGTG TGATATCTAC CCGCTTCGCG TCGGCATCCG GTCAGTGGCA
1801  GTGAAGGGCG AACAGTTCCT GATTAACCAC AAACCGTTCT ACTTTACTGG CTTTGGTCGT
1861  CATGAAGATG CGGACTTGCG TGGCAAAGGA TTCGATAACG TGCTGATGGT GCACGACCAC
1921  GCATTAATGG ACTGGATTGG GGCCAACTCC TACCGTACCT CGCATTACCC TTACGCTGAA
1981  GAGATGCTCG ACTGGGCAGA TGAACATGGC ATCGTGGTGA TTGATGAAAC TGCTGCTGTC
2041  GGCTTTAACC TCTCTTTAGG CATTGGTTTC GAAGCGGGCA ACAAGCCGAA AGAACTGTAC
2101  AGCGAAGAGG CAGTCAACGG GGAAACTCAG CAAGCGCACT TACAGGCGAT TAAAGAGCTG
2161  ATAGCGCGTG ACAAAAACCA CCCAAGCGTG GTGATGTGGA GTATTGCCAA CGAACCGGAT
2221  ACCCGTCCGC AAGGTGCACG GGAATATTTC GCGCCACTGG CGGAAGCAAC GCGTAAACTC
2281  GACCCGACGC GTCCGATCAC CTGCGTCAAT GTAATGTTCT GCGACGCTCA CACCGATACC
2341  ATCAGCGATC TCTTTGATGT GCTGTGCCTG AACCGTTATT ACGGATGGTA TGTCCAAAGC
2401  GGCGATTTGG AAACGGCAGA GAAGGTACTG GAAAAGAAC TTCTGGCCTG GCAGGAGAAA
2461  CTGCATCAGC CGATTATCAT CACCGAATAC GGCGTGGATA CGTTAGCCGG GCTGCACTCA
2521  ATGTACACCG ACATGTGGAG TGAAGAGTAT CAGTGTGCAT GGCTGGATAT GTATCACCGC
2581  GTCTTTGATC GCGTCAGCGC CGTCGTCGGT GAACAGGTAT GGAATTTCGC CGATTTTGCG
2641  ACCTCGCAAG GCATATTGCG CGTTGGCGGT AACAAGAAAG GGATCTTCAC TCGCGACCGC
2701  AAACCGAAGT CGGCGGCTTT TCTGCTGCAA AAACGCTGGA CTGGCATGAA CTTCGGTGAA
2761  AAACCGCAGC AGGGAGGCAA ACAATGAGAG CTCGTTGTT GATGGATCTG TGATGCATGC
2821  AATAGAACTT ACGCAAATAT TAGCAAAAAT ATATTAGACA ATACTACAAT TAACGATGAG
2881  TGTAGATGCT GTTATTTTGA ACCACAGATT AGGATTCTTG ATAGAGATGA
2941  GATGCTCAAT GGATCATCGT GTGATATGAA CAGACATTGT ATTATGATGA ATTTACCTGA
3001  TGTAGGCGAA TTTGGATCTA GTATGTTGGG GAAATATGAA CCTGACATGA TTAAGATTGC
3061  TCTTTCGGTG GCTGGCGGCC CGCTCGAGAA AAATTGAAAA TAAATACAAA GGTTCTTGAG
3121  GGTTGTGTTA AATTGAAAGC GAGAAATAAT CATAAATAAG CCACCACCGT TTAAACAGTC
3181  GACGGTATCG ATAAGCTTGA TATCGAATTC CTGCAGCCCG TACGCGCAGG CAGCATGGAG
3241  TCGCGCGGTC GCCGTTGTCC CGAAATGATA TCCGTACTGG GTCCCATTTC GGGGCACGTG
3301  CTGAAAGCCG TGTTTAGTCG CGGCGACACG CCGGTGCTGC CGCACGAGAC GCGACTCCTG
3361  CAGACGGGTA TCCACGTGCG CGTGAGCCAG CCCTCGCTGA TCCTGGTGTC GCAGTACACG
3421  CCCGACTCGA CGCCATGCCA CCGCGGCGAC AATCAGCTGC AGGTGCAGCA CACGTACTTT
3481  ACGGGCAGCG AGGTGGAGAA CGTGTCGGTC AACGTGCACA ACCCCACGGG CCGGAGCATC
3541  TGCCCCAGCC AAGAGCCCAT GTCGATCTAT GTGTACGCGC TGCCGCTCAA GATGCTGAAC
3601  ATCCCCAGCA TCAACGTGCA CCACTACCCG TCGGCGGCCG AGCGCAAACA CCGACACCTG
```

```
3661 CCCGTAGCTG ACGCTGTGAT TCACGCGTCG GGCAAGCAGA TGTGGCAGGC GCGTCTCACG
3721 GTCTCGGGAC TGGCCTGGAC GCGTCAGCAG AACCAGTGGA AAGAGCCCGA CGTCTACTAC
3781 ACGTCAGCGT TCGTGTTTCC CACCAAGGAC GTGGCACTGC GGCACGTGGT GTGCGCGCAC
3841 GAGCTGGTTT GCTCCATGGA GAACACGGCG GCAACAAGA TGCAGGTGAT AGGTGACCAG
3901 TACGTCAAGG TGTACCTGGA GTCCTTCTGC GAGGACGTGC CCTCCGGCAA GCTCTTTATG
3961 CACGTCACGC TGGGCTCTGA CGTGGAAGAG GACCTGACGA TGACCCGCAA CCCGCAACCC
4021 TTCATGCGCC CCCACGAGCG CAACGGCTTT ACGGTGTTGT GTCCCAAAAA TATGATAATC
4081 AAACCGGGCA AGATCTCGCA CATCATGCTG GATGTGGCTT TTACCTCACA CGAGCATTTT
4141 GGGCTGCTGT GTCCCAAGAG CATCCCGGGC CTGAGCATCT CAGGTAACCT ATTGATGAAC
4201 GGGCAGCAGA TCTTCCTGGA GGTGCAAGCG ATACGCGAGA CCGTGGAACT GCGTCAGTAC
4261 GATCCCGTGG CTGCGCTCTT CTTTTTCGAT ATCGACTTGC TGCTGCAGCG CGGGCCTCAG
4321 TACAGCGAAC ACCCCACCTT CACCAGCCAG TATCGCATCC AGGGCAAGCT TGAGTACCGA
4381 CACACCTGGG ACCGGCACGA CGAGGGTGCC GCCCAGGGCG ACGACGACGT CTGGACCAGC
4441 GGATCGGACT CCGACGAGGA ACTCGTAACC ACCGAGCGCA AGACGCCCCG CGTTACCGGC
4501 GGCGGCGCCA TGGCGGGCGC CTCCACTTCC GCGGGCCGCA AACGCAAATC AGCATCCTCG
4561 GCGACGGCGT GCACGGCGGG CGTTATGACA CGCGGCCGCC TTAAGGCCGA GTCCACCGTC
4621 GCGCCCGAAG AGGACACCGA CGAGGATTCC GACAACGAAA TCCACAATCC GGCCGTGTTC
4681 ACCTGGCCAC CCTGGCAGGC CGGCATCCTG GCCCGCAACC TGGTGCCCAT GGTGGCTACG
4741 GTTCAGGGTC AGAATCTGAA GTACCAGGAG TTCTTCTGGG ACGCCAACGA CATCTACCGC
4801 ATCTTCGCCG AATTGGAAGG CGTATGGCAG CCCGCTGCGC AACCCAAACG TCGCCGCCAC
4861 CGGCAAGACG CCTTGCCCGG GCCATGCATC GCCTCGACGC CCAAAAAGCA CCGAGGTTGA
4921 TTTTTATGGC GCGCCCTGCA GGGAAAGTTT TATAGGTAGT TGATAGAACA AAATACATAA
4981 TTTTGTAAAA ATAAATCACT TTTTATACTA ATATGACACG ATTACCAATA CTTTTGTTAC
5041 TAATATCATT AGTATACGCT ACACCTTTTC CTCAGACATC TAAAAAAATA GGTGATGATG
5101 CAACTTTATC ATGTAATCGA AATAATACAA ATGACTACGT TGTTATGAGT GCTTGGTATA
5161 AGGAGCCCAA TTCCATTATT CTTTTAGCTG CTAAAAGCGA CGTCTTGTAT TTTGATAATT
5221 ATACCAAGGA TAAAATATCT TACGACTCTC CATACGATGA TCTAGTTACA ACTATCACAA
5281 TTAAATCATT GACTGCTAGA GATGCCGGTA CTTATGTATG TGCATTCTTT ATGACATCGC
5341 CTACAAATGA CACTGATAAA GTAGATTATG AAGAATACTC CACAGAGTTG ATTGTAAATA
5401 CAGATAGTGA ATCGACTATA GACATAAATAC TATCTGGATC TACACATTCA CCAGAAACTA
5461 GTTAAGCTTG TCTCCCTATA GTGAGTCGTA TTAGAGCTTG GCGTAATCAT GGTCATAGCT
5521 GTTTCCTGTG TGAAATTGTT ATCCGCTCAC AATTCCACAC AACATACGAG CCGGAAGCAT
5581 AAAGTGTAAA GCCTGGGGTG CCTAATGAGT GAGCTAACTC ACATTAATTG CGTTGCGCTC
5641 ACTGCCCGCT TTCGAGTCGG GAAACCTGTC GTGCCAGCTG CATTAATGAA TCGGCCAACG
5701 CGCGGGGAGA GGCGGTTTGC GTATTGGGCG CTCTTCCGCT TCCTCGCTCA CTGACTCGCT
5761 GCGCTCGGTC GTTCGGCTGC GGCGAGCGGT ATCAGCTCAC TCAAAGGCGG TAATACGGTT
5821 ATCCACAGAA TCAGGGGATA ACGCAGGAAA GAACATGTGA GCAAAAGGCC AGCAAAAGGC
5881 CAGGAACCGT AAAAAGGCCG CGTTGCTGGC GTTTTTCGAT AGGCTCCGCC CCCCTGACGA
5941 GCATCACAAA AATCGACGCT CAAGTCAGAG GTGGCGAAAC CCGACAGGAC TATAAAGATA
6001 CCAGGCGTTT CCCCCTGGAA GCTCCCTCGT GCGCTCTCCT GTTCCGACCC TGCCGCTTAC
6061 CGGATACCTG TCCGCCTTTC TCCCTTCGGG AAGCGTGGCG CTTTCTCATA GCTCACGCTG
6121 TAGGTATCTC AGTTCGGTGT AGGTCGTTCG CTCCAAGCTG GGCTGTGTGC ACGAACCCCC
6181 CGTTCAGCCC GACCGCTGCG CCTTATCCGG TAACTATCGT CTTGAGTCCA ACCCGGTAAG
6241 ACACGACTTA TCGCCACTGG CAGCAGCCAC TGGTAACAGG ATTAGCAGAG CGAGGTATGT
6301 AGGCGGTGCT ACAGAGTTCT TGAAGTGGTG GCCTAACTAC GGCTACACTA GAAGGACAGT
6361 ATTTGGTATC TGCGCTCTGC TGAAGCCAGT TACCTTCGGA AAAAGAGTTG GTAGCTCTTG
6421 ATCCGGCAAA CAAACCACCG CTGGTAGCGG TGGTTTTTTT GTTTGCAAGC AGCAGATTAC
6481 GCGCAGAAAA AAAGGATCTC AAGAAGATCC TTTGATCTTT TCTACGGGGT CTGACGCTCA
6541 GTGGAACGAA AACTCACGTT AAGGGATTTT GGTCATGAGA TTATCAAAAA GGATCTTCAC
6601 CTAGATCCTT TTAAATTAAA AATGAAGTTT TAAATCAATC TAAAGTATAT ATGAGTAAAC
6661 TTGGTCTGAC AGTTACCAAT GCTTAATCAG TGAGGCACCT ATCTCAGCGA TCTGTCTATT
6721 TCGTTCATCC ATAGTTGCCT GACTCCCCGT CGTGTAGATA ACTACGATAC GGGAGGGCTT
6781 ACCATCTGGC CCCAGTGCTG CAATGATACC GCGAGACCCA CGCTCACCGG CTCCAGATTT
6841 ATCAGCAATA AACCAGCCAG CCGGAAGGGC CGAGCGCAGA AGTGGTCCTG CAACTTTATC
6901 CGCCTCCATC CAGTCTATTA ATTGTTGCCG GGAAGCTAGA GTAAGTAGTT CGCCAGTTAA
6961 TAGTTTGCGC AACGTTGTTG GCATTGCTAC AGGCATCGTG GTGTCACGCT CGTCGTTTGG
7021 TATGGCTTCA TTCAGCTCCG GTTCCCAACG ATCAAGGCGA GTTACATGAT CCCCCATGTT
7081 GTGCAAAAAA GCGGTTAGCT CCTTCGGTCC TCCGATCGTT GTCAGAAGTA AGTTGGCCGC
7141 AGTGTTATCA CTCATGGTTA TGGCAGCACT GCATAATTCT CTTACTGTCA TGCCATCCGT
7201 AAGATGCTTT TCTGTGACTG GTGAGTACTC AACCAAGTCA TTCTGAGAAT AGTGTATGCG
7261 GCGACCGAGT TGCTCTTGCC CGGCGTCAAT ACGGGATAAT ACCGCGCCAC ATAGCAGAAC
7321 TTTAAAAGTG CTCATCATTG GAAAACGTTC TTCGGGGCGA AAACTCTCAA GGATCTTACC
7381 GCTGTTGAGA TCCAGTTCGA TGTAACCCAC TCGTGCACCC AACTGATCTT CAGCATCTTT
7441 TACTTTCACC AGCGTTTCTG GGTGAGCAAA AACAGGAAGG CAAAATGCCG CAAAAAAGGG
7501 AATAAGGGCG ACACGGAAAT GTTGAATACT CATACTCTTC CTTTTTCAAT ATTATTGAAG
7561 CATTTATCAG GGTTATTGTC TCATGAGCGG ATACATATTT GAATGTATTT AGAAAAATAA
7621 ACAAATAGGG GTTCCGCGCA CATTTCCCCG AAAAGTGCCA CCTGACGTCT AAGAAACCAT
7681 TATTATCATG ACATTAACCT ATAAAAATAG GCGTATCACG AGGCCCTTTC GTCTCGCGCG
```

FIG. 4B

```
7741 TTTCGGTGAT GACGGTGAAA ACCTCTGACA CATGCAGCTC CCGGAGACGG TCACAGCTTG
7801 TCTGTAAGCG GATGCCGGGA GCAGACAAGC CCGTCAGGGC GCGTCAGCGG GTGTTGGCGG
7861 GTGTCGGGGC TGGCTTAACT ATGCGGCATC AGAGCAGATT GTACTGAGAG TGCACCATAT
7921 GCGGTGTGAA ATACCGCACA GATGCGTAAG GAGAAAATAC CGCATCAGGC GCCATTCGCC
7981 ATTCAGGCTG CGCAACTGTT GGGAAGGGCG ATCGGTGCGG GCCTCTTCGC TATTACGCCA
8041 GCTGGCGAAA GGGGGATGTG CTGCAAGGCG ATTAAGTTGG GTAACGCCAG GGTTTTCCCA
8101 GTCACGACGT TGTAAAACGA CGGCCAGTGA ATTGGATTTA GGTGACACTA TA
```

FIG. 4C (SEQ ID NO:C)

```
atggtcaaac agattaaggt tcgagtggac atggtgcggc atagaatcaa ggagcacatg      60
ctgaaaaaat atcccagac ggaagagaaa ttcactggcg cctttaatat gatgggagga      120
tgtttgcaga atgccttaga tatcttagat aaggttcatg agcctttcga ggagatgaag      180
tgtattgggc taactatgca gagcatgtat gagaactaca ttgtacctga ggataagcgg      240
gagatgtgga tggcttgtat taaggagctg catgatgtga gcaagggcgc cgctaacaag      300
ttgggggtg cactgcaggc taaggcccgt gctaaaaagg atgaacttag gagaagatg       360
atgtatatgt gctacaggaa tatagagttc tttaccaaga actcagcctt ccctaagacc      420
accaatggct gcagtcaggc catggcggca ctgcagaact tgcctcagtg ctcccctgat      480
gagattatgg cttatgccca gaaaatattt aagatttttgg atgaggagag agacaaggtg      540
ctcacgcaca ttgatcacat atttatggat atcctcacta catgtgtgga aacaatgtgt      600
aatgagtaca aggtcactag tgacgcttgt atgatgacca tgtacggggg catctctctc      660
ttaagtgagt tctgtcgggt gctgtgctgc tatgtcttag aggagactag tgtgatgctg      720
```

FIG. 5A

```
gccaagcggc ctctgataac caagcctgag gttatcagtg taatgaagcg ccgcattgag     780
gagatctgca tgaaggtctt tgcccagtac attctggggg ccgatcctct gagagtctgc     840
tctcctagtg tggatgacct acgggccatc gccgaggagt cagatgagga agaggctatt     900
gtagcctaca ctttggccac cgctggtgtc agctcctctg attctctggt gtcaccccca     960
gagtcccctg tacccgcgac tatccctctg tcctcagtaa ttgtggctga aacagtgat    1020
caggaagaaa gtgagcagag tgatgaggaa gaggaggagg gtgctcagga ggagcgggag    1080
gacactgtgt ctgtcaagtc tgagccagtg tctgagatag aggaagttgc cccagaggaa    1140
gaggaggatg gtgctgagga acccaccgcc tctggaggca agagcaccca ccctatggtg    1200
actagaagca aggctgacca gggtgacatc ctcgccagg ctgtcaatca tgccggtatc    1260
gattccagta gcaccggccc cacgctgaca acccactctt gcagcgttag cagcgccct    1320
cttaacaagc cgaccccac cagcgtcgcg gttactaaca ctcctctccc cggggcatcc    1380
gctactcccg agctcagccc gcgtaagaaa ccggcaaaa ccacgcgtcc tttcaaggtg    1440
attattaaac cgcccgtgcc tcccgcgcct atcatgctgc ccctcatcaa acaggaagac    1500
atcaagcccg agccgactt taccatccag taccgcaaca agattatcga taccgccggc    1560
tgtatcgtga tctctgatag cgaggaagaa cagggtgaag aagtcgaaac ccgcggtgct    1620
accgcgtctt ccccttccac cggcagcggc acgccgcgag tgacctctcc cacgcacccg    1680
ctctcccaga tgaaccacc tcctcttccc gatcccttgg gccggcccga tgaagatagt    1740
tcctcttcgt cttcctcctc ctgcagttcg gcttcggact cggagagtga gtccgaggag    1800
atgaaatgca gcagtggcgg aggagcatcc gtgacctcga gccaccatgg gcgcggcggt    1860
tttggtggcg cggcctcctc ctctctgctg agctgcggcc atcagagcag cggcggggcg    1920
```

FIG. 5B

```
agcaccggac ccgcaagaa gaagagcaaa cgcatctccg agttggacaa cgagaaggtg    1980
cgcaatatca tgaagataa gaacacccc ttctgcacac ccaacgtgca gactcggcgg    2040
ggtcgcgtca agattgacga ggtgagccgc atgttccgca acaccaatcg ctctcttgag    2100
tacaagaacc tgcccttcac gattcccagt atgaccagg tgttagatga ggcatcaaa    2160 gcctgcaaaa ccatgcaggt gaacaacaag ggcatccaga ttatctacac ccgcaatcat    2220
gaggtgaaga gtgaggtgga tgcggtgcgg tgtcgcctgg gcaccatgtg caacctggcc    2280
ctctccactc ccttcctcat ggagcacacc atgccgtga cacatccacc cgaagtggcg    2340
cagcgcacag ccgatgcttg taacgaaggc gtcaaggccg cgtggagcct caaagaattg    2400
cacacccacc aattatgccc ccgttcctcc gattaccgca acatgatcat ccacgctgcc    2460
acccccgtgg acctgttggg cgctctcaac ctgtgcctgc cctgatgca aagtttccc    2520 aaacaggtca tggtgcgcat cttctccacc aaccagggtg ggttcatgct gcctatctac    2580
gagacggccg cgaaggccta cgccgtgggg cagtttgagc agcccaccga gacccctccc    2640
gaagacctgg acaccctgag cctggccatc gaggcagcca tccaggacct gaggaacaag    2700
tctcagtaa                                                            2709
```

FIG. 5C

SEQUENCE LISTING

```
Sequence total quantity: 31
SEQ ID NO: 1            moltype =    length =
SEQUENCE: 1
000

SEQ ID NO: 2            moltype = AA  length = 10
FEATURE                 Location/Qualifiers
source                  1..10
                        mol_type = protein
```

```
                                    organism = Synthetic construct
SEQUENCE: 2
GGGSSGGGSG                                                                          10

SEQ ID NO: 3            moltype = AA   length = 12
FEATURE                 Location/Qualifiers
source                  1..12
                        mol_type = protein
                        organism = Synthetic construct
SEQUENCE: 3
ESKYGPPCPP CP                                                                       12

SEQ ID NO: 4            moltype = AA   length = 12
FEATURE                 Location/Qualifiers
source                  1..12
                        mol_type = protein
                        organism = Homo sapiens
SEQUENCE: 4
ESKYGPPCPS CP                                                                       12

SEQ ID NO: 5            moltype = AA   length = 22
FEATURE                 Location/Qualifiers
source                  1..22
                        mol_type = protein
                        organism = Synthetic construct
SEQUENCE: 5
ESKYGPPCPP CPGGGSSGGG SG                                                            22

SEQ ID NO: 6            moltype = AA   length = 39
FEATURE                 Location/Qualifiers
source                  1..39
                        mol_type = protein
                        organism = Synthetic construct
SEQUENCE: 6
IEVMYPPPYL DNEKSNGTII HVKGKHLCPS PLFPGPSKP                                          39

SEQ ID NO: 7            moltype = AA   length = 48
FEATURE                 Location/Qualifiers
source                  1..48
                        mol_type = protein
                        organism = Synthetic construct
SEQUENCE: 7
AKPTTTPAPR PPTPAPTIAS QPLSLRPEAC RPAAGGAVHT RGLDFACD                                48

SEQ ID NO: 8            moltype = AA   length = 45
FEATURE                 Location/Qualifiers
source                  1..45
                        mol_type = protein
                        organism = Synthetic construct
SEQUENCE: 8
TTTPAPRPPT PAPTIASQPL SLRPEACRPA AGGAVHTRGL DFACD                                   45

SEQ ID NO: 9            moltype = AA   length = 129
FEATURE                 Location/Qualifiers
source                  1..129
                        mol_type = protein
                        organism = Synthetic construct
SEQUENCE: 9
ESKYGPPCPP CPGGGSSGGG SGGQPREPQV YTLPPSQEEM TKNQVSLTCL VKGFYPSDIA                   60
VEWESNGQPE NNYKTTPPVL DSDGSFFLYS RLTVDKSRWQ EGNVFSCSVM HEALHNHYTQ                  120
KSLSLSLGK                                                                         129

SEQ ID NO: 10           moltype = AA   length = 229
FEATURE                 Location/Qualifiers
source                  1..229
                        mol_type = protein
                        organism = Synthetic construct
SEQUENCE: 10
ESKYGPPCPS CPAPEFEGGP SVFLFPPKPK DTLMISRTPE VTCVVVDVSQ EDPEVQFNWY                   60
VDGVEVHQAK TKPREEQFQS TYRVVSVLTV LHQDWLNGKE YKCKVSNKGL PSSIEKTISK                  120
AKGQPREPQV YTLPPSQEEM TKNQVSLTCL VKGFYPSDIA VEWESNGQPE NNYKTTPPVL                  180
DSDGSFFLYS RLTVDKSRWQ EGNVFSCSVM HEALHNHYTQ KSLSLSLGK                              229

SEQ ID NO: 11           moltype = AA   length = 229
FEATURE                 Location/Qualifiers
source                  1..229
                        mol_type = protein
                        organism = Synthetic construct
SEQUENCE: 11
```

```
ESKYGPPCPP CPAPEFEGGP SVFLFPPKPK DTLMISRTPE VTCVVVDVSQ EDPEVQFNWY    60
VDGVEVHQAK TKPREEQFQS TYRVVSVLTV LHQDWLNGKE YKCKVSNKGL PSSIEKTISK   120
AKGQPREPQV YTLPPSQEEM TKNQVSLTCL VKGFYPSDIA VEWESNGQPE NNYKTTPPVL   180
DSDGSFFLYS RLTVDKSRWQ EGNVFSCSVM HEALHNHYTQ KSLSLSLGK              229

SEQ ID NO: 12           moltype = AA   length = 107
FEATURE                 Location/Qualifiers
source                  1..107
                        mol_type = protein
                        organism = Synthetic construct
SEQUENCE: 12
GQPREPQVYT LPPSQEEMTK NQVSLTCLVK GFYPSDIAVE WESNGQPENN YKTTPPVLDS    60
DGSFFLYSRL TVDKSRWQEG NVFSCSVMHE ALHNHYTQKS LSLSLGK                 107

SEQ ID NO: 13           moltype = AA   length = 21
FEATURE                 Location/Qualifiers
source                  1..21
                        mol_type = protein
                        organism = Synthetic construct
SEQUENCE: 13
LCYLLDGILF IYGVILTALF L                                             21

SEQ ID NO: 14           moltype = AA   length = 27
FEATURE                 Location/Qualifiers
source                  1..27
                        mol_type = protein
                        organism = Synthetic construct
SEQUENCE: 14
FWVLVVVGGV LACYSLLVTV AFIIFWV                                       27

SEQ ID NO: 15           moltype = AA   length = 28
FEATURE                 Location/Qualifiers
source                  1..28
                        mol_type = protein
                        organism = Synthetic construct
SEQUENCE: 15
MFWVLVVVGG VLACYSLLVT VAFIIFWV                                      28

SEQ ID NO: 16           moltype = AA   length = 22
FEATURE                 Location/Qualifiers
source                  1..22
                        mol_type = protein
                        organism = Synthetic construct
SEQUENCE: 16
MALIVLGGVA GLLLFIGLGI FF                                            22

SEQ ID NO: 17           moltype = AA   length = 21
FEATURE                 Location/Qualifiers
source                  1..21
                        mol_type = protein
                        organism = Synthetic construct
SEQUENCE: 17
IYIWAPLAGT CGVLLLSLVI T                                             21

SEQ ID NO: 18           moltype = AA   length = 23
FEATURE                 Location/Qualifiers
source                  1..23
                        mol_type = protein
                        organism = Synthetic construct
SEQUENCE: 18
IYIWAPLAGT CGVLLLSLVI TLY                                           23

SEQ ID NO: 19           moltype = AA   length = 24
FEATURE                 Location/Qualifiers
source                  1..24
                        mol_type = protein
                        organism = Synthetic construct
SEQUENCE: 19
IYIWAPLAGT CGVLLLSLVI TLYC                                          24

SEQ ID NO: 20           moltype = AA   length = 27
FEATURE                 Location/Qualifiers
source                  1..27
                        mol_type = protein
                        organism = Synthetic construct
SEQUENCE: 20
IISFFLALTS TALLFLLFFL TLRFSVV                                       27

SEQ ID NO: 21           moltype = AA   length = 112
```

```
FEATURE                 Location/Qualifiers
source                  1..112
                        mol_type = protein
                        organism = Synthetic construct
SEQUENCE: 21
RVKFSRSADA PAYQQGQNQL YNELNLGRRE EYDVLDKRRG RDPEMGGKPR RKNPQEGLYN    60
ELQKDKMAEA YSEIGMKGER RRGKGHDGLY QGLSTATKDT YDALHMQALP PR           112

SEQ ID NO: 22           moltype = AA   length = 41
FEATURE                 Location/Qualifiers
source                  1..41
                        mol_type = protein
                        organism = Synthetic construct
SEQUENCE: 22
RSKRSRLLHS DYMNMTPRRP GPTRKHYQPY APPRDFAAYR S                        41

SEQ ID NO: 23           moltype = AA   length = 41
FEATURE                 Location/Qualifiers
source                  1..41
                        mol_type = protein
                        organism = Synthetic construct
SEQUENCE: 23
RSKRSRGGHS DYMNMTPRRP GPTRKHYQPY APPRDFAAYR S                        41

SEQ ID NO: 24           moltype = AA   length = 42
FEATURE                 Location/Qualifiers
source                  1..42
                        mol_type = protein
                        organism = Synthetic construct
SEQUENCE: 24
KRGRKKLLYI FKQPFMRPVQ TTQEEDGCSC RFPEEEEGGC EL                       42

SEQ ID NO: 25           moltype = AA   length = 42
FEATURE                 Location/Qualifiers
source                  1..42
                        mol_type = protein
                        organism = Synthetic construct
SEQUENCE: 25
ALYLLRRDQR LPPDAHKPPG GGSFRTPIQE EQADAHSTLA KI                       42

SEQ ID NO: 26           moltype =      length =
SEQUENCE: 26
000

SEQ ID NO: 27           moltype = AA   length = 24
FEATURE                 Location/Qualifiers
source                  1..24
                        mol_type = protein
                        organism = Synthetic construct
SEQUENCE: 27
LEGGGEGRGS LLTCGDVEEN PGPR                                           24

SEQ ID NO: 28           moltype = AA   length = 354
FEATURE                 Location/Qualifiers
source                  1..354
                        mol_type = protein
                        organism = Synthetic construct
SEQUENCE: 28
LVTSLLLCEL PHPAFLLIPR KVCNGIGIGE FKDSLSINAT NIKHFKNCTS ISGDLHILPV    60
AFRGDSFTHT PPLDPQELDI LKTVKEITGF LLIQAWPENR TDLHAFENLE IIRGRTKQHG   120
QFSLAVVSLN ITSLGLRSLK EISDGDVIIS GNKNLCYANT INWKKLFGTS GQKTKIISNR   180
GENSCKATGQ VCHALCSPEG CWGPEPRDCV SCRNVSRGRE CVDKCNLLEG EPREFVENSE   240
CIQCHPECLP QAMNITCTGR GPDNCIQCAH YIDGPHCVKT CPAGVMGENN TLVWKYADAG   300
HVCHLCHPNC TYGCTGPGLE GCPTNGPKIP SIATGMVGAL LLLLVVALGI GLFM         354

SEQ ID NO: 29           moltype = DNA   length = 9388
FEATURE                 Location/Qualifiers
source                  1..9388
                        mol_type = other DNA
                        organism = Synthetic construct
SEQUENCE: 29
cctcctgaaa aactggaatt taatacacca tttgtgttca tcatcagaca tgatattact    60
ggatttatat tgtttatggg taaggtagaa tctccttaat atgggtacgg tgtaaggaat   120
cattatttta tttatattga tgggtacgtg aaatgtgaat tttcttaata aatattattt   180
ttattaaatg tgtatatgtt gttttgcgat agccatgtat ctactaatca gatctattag   240
agatattatt aattctggtg caatatgaca aaaattatac actaattagc gtctcgtttc   300
agacatggat ctgtcacgaa ttaatacttg gaagtctaag cagctgaaaa gctttctctc   360
tagcaaagat gcatttaagg cggatgtcca tggacatagt gccttgtatt atgcaatagc   420
tgataataac gtgcgtctag tatgtacgtt gttgaacgcg ggagcattga aaaatcttct   480
```

```
agagaatgaa tttccattac atcaggcagc cacattggaa gataccaaaa tagtaaagat      540
tttggctatt cagtggactg gatgattcga ggtaccgact attgttctat attatatatg      600
gttgttgatg gatctgtgat gcatgcaata gctgataata gaacttacgc aaatattagc      660
aaaaatatat tagacaatac tacaattaac gatgagtgta gatgctgtta ttttgaacca      720
cagattagga ttcttgatag agatgagatg ctcaatgaat catcgtgtga tatgaacaga      780
cattgtatta tgatgaattt acctgatgta ggcgaatttg gatctagtat gttgggaaa       840
tatgaacctg acatgattaa gattgctctt tcggtggctg ggtaccaggc gcgcatttca      900
ttttgttttt ttctatgcta taaatggtac gtcctgtaga aaccccaacc cgtgaaatca      960
aaaaactcga cggcctgtgg gcattcagtc tggatcgcga aaactgtgga attgatcagc     1020
gttggtggga aagcgcgtta caagaaagcc gggcaattgc tgtgccaggc agttttaacg     1080
atcagttcgc cgatgcagat attcgtaatt atgcgggcaa cgtctggtat cagcgcgaag     1140
tctttatacc gaaaggttgg gcaggccagc gtatcgtgct gcgtttcgat gcggtcactc     1200
attacggcaa agtgtgggtc aataatcagg aagtgatgga gcatcagggc ggctatacgc     1260
catttgaagc cgatgtcacg ccgtatgtta ttgccggcag aagtgtacgt atcaccgttt     1320
gtgtgaacaa cgaactgaac tggcagacta tcccgccggg aatggtgatt accgacgaaa     1380
acggcaagaa aaagcagtct tacttccatg atttctttaa ctatgccgga atccatcgca     1440
gcgtaatgct ctacaccacg ccgaacacct gggtggacga tatcaccgtg gtgacgcatg     1500
tcgcgcaaga ctgtaaccac cgtctgttg actggcaggt ggtggccaat ggtgatgtca     1560
gcgttgaact gcgtgatgcg gatcaacagg tggttgcaac tggacaaggc actagcggga     1620
ctttgcaagt ggtgaatccg cacctctggc aaccgggtga aggttatctc tatgaactgt     1680
gcgtcacagc caaaagccag acagagtgtg atatctaccc gcttcgcgtc ggcatccggt     1740
cagtggcagt gaagggcgaa cagttcctga ttaaccacaa accgttctac tttactggct     1800
ttggtcgtca tgaagatgcg gacttgcgtg gcaaaggatt cgataacgtg ctgatggtgc     1860
acgaccacgc attaatggac tggattgggg ccaactccta ccgtacctcg cattacccctt    1920
acgctgaaga gatgctcgac tgggcagatg aacatgcat cgtggtgatt gatgaaactg      1980
ctgctgtcgg ctttaacctc tctttaggca ttggtttcga agcgggcaac aagccgaaag     2040
aactgtacag cgaagaggca gtcaacgggg aaactcagca agcgcactta caggcgatta     2100
aagagctgat agcgcgtgac aaaaaccacc caagcgtggt gatgtggagt attgccaacg     2160
aaccggatac ccgtccgcaa ggtgcacggg aatatttcgc gccactggcg gaagcaacgc     2220
gtaaactcga cccgacgcgt ccgatcacct cgtcaatgt aatgttctgc gacgctcaca      2280
ccgataccat cagcgatctc tttgatgtgc tgtgcctgaa ccgttattac ggatggtatg     2340
tccaaagcgg cgatttggaa acggcagaga aggtactgga aaaagaactt ctggcctggc     2400
aggagaaact gcatcagccg attatcatca ccgaatacgg cgtggatacg ttagcccggc     2460
tgcactcaat gtacaccgac atgggagtg aagagtatca gtgtgcatgg ctggatatgt       2520
atcaccgcgt ctttgatcgc gtcagcgccc tcgtcggtga acaggtatgg aatttcgccg     2580
attttgcgac ctcgcaaggc atattgcgcg ttggcggtaa caagaaaggg atcttcactc     2640
gcgaccgcaa accgaagtcg gcggcttttc tgctgcaaaa acgctggact ggcatgaact     2700
tcggtgaaaa accgcagcag ggaggcaaac aatgagagct cggttgttga tggatctgtg     2760
atgcatgcaa tagctgataa tagaacttac gcaaatatta gcaaaaatat attagacaat     2820
actacaatta acgatgagtg tagatgctgt tattttgaac cacagattag gattcttgat     2880
agagatgaga tgctcaatgg atcatcgtgt gatatgaaca gacattgtat tatgatgaat     2940
ttacctgatg taggcgaatt tggatctagt atgttgggga aatatgaacc tgacatgatt     3000
aagattgctc tttcggtggc tggcgggccg ctcgagaaaa attgaaaata aatacaaagg     3060
ttcttgaggg ttgtgttaaa ttgaaagcga gaaataatca taataagcc accaccgttt      3120
aaacgccacc acaatggtca aacagattaa ggttcgagtg gacatggtgc ggcatagaat     3180
caaggagcac atgctgaaaa aatataccca gacggaaagag aaattcactg gcgcctttaa    3240
tatgatggga ggatgttgc agaatgcctt agatatctta gataaggttc atgagccttt      3300
cgaggagatg aagtgtattg gctaactat gcagagcatg tatgagaact acattgtacc      3360
tgaggataag cgggagatgt ggatggcttg tattaaggag ctgcatgatg tgagcaaggg     3420
cgccgctaac aagttggggg gtgcactgca ggctaaggcc cgtgctaaaa aggatgaact     3480
taggagaaag atgatgtata tgtgctacag gaatatagag ttctttacca agaactcgac     3540
cttccctaag accaccaatg gctgcagtca ggccatggcg gcactgcaga acttgcctca     3600
gtgctcccct gatgagatta tggcttatgc ccagaaaata tttaagagtt tggatgagga     3660
gagagacaag gtgctcacgc acattgatca catatttatg gatatcctca ctacatgtgt     3720
ggaaacaatg tgtaatgagt acaaggtcac tagtgacgct tgtatgatga ccatgtacgg    3780
gggcatctct ctcttaagtg agttctgtcg ggtgctgtgc tgctatgtct tagaggagac     3840
tagtgtgatg ctgccaagc ggcctctgat aaccaagcct gaggttatca gtgtaatgaa       3900
gcgccgcatt gaggagatct gcatgaaggt ctttgcccag tacattctgg gggccgatcc     3960
tctgagagtc tgctctccta gtgtggatga cctacgggcc atcgccggag agtcagatga     4020
ggaagaggct attgtagcct cacctttggc caccgccggt gtcagctcct ctgattctct     4080
ggtgtcaccc ccagagtccc ctgtacccgc gactatccct ctgtcctcag taattgtggc     4140
tgagaacagt gatcaggaag aaagtgagca gagtgatgag gaagaggagg agggtgctca     4200
ggaggagcgg gaggacactg tgtctgtcaa gtctgagcca gtgtctgaga tagaggaagt     4260
tgcccagag gaagaggagg atggtgctga ggaacccacc gcctctggag gcaagagcaa      4320
ccaccctatg gtgactagaa gcaaggctga ccagggtgac atcctcgccc aggctgtcaa     4380
tcatgccggt atcgattcca gtagcaccgg ccccacgctg acaacccact cttgcagcgt     4440
tagcagcgcc cctcttaaca agccgacccc caccagcgtc gcggttacta acactcctct     4500
cccgcgggca tccgctactc ccgagctcag cccgcgtaag aaaccgcgca aaaccacgcg     4560
tccttttcaag gtgattatta aaccgcccgt gcctcccggc cctatcatgc tgccctcat     4620
caaacaggaa gacatcaagc ccgagcccga ctttaccatc cagtaccgca acaagattat     4680
cgataccgcc ggctgtatcg tgatctctga tagcgaggaa gaacaggtg aagaagtcga     4740
aacccgcggt gctaccgcgt cttcccttc caccggcagc ggcacgccgc gagtgacctc     4800
tcccacgcac ccgctctccc agatgaacca ccctcctctt cccgatccct gggccggcc       4860
cgatgaagat agttccttct cgtcttcctc ctcctgaagt tcggcttcgg actcggagag     4920
tgagtccgag gagatgaaat gcagcagttg cggaggagca tccgtgacct cgagccacca     4980
tgggcgcggc ggttttggtg gcgcggcctc ctcctctctg ctgagctgcg gccatcagag     5040
cagcggcggg gcgagcaccg gacccgcaa gaagaagagc aaacgcatct ccgagttgga      5100
caacgagaag gtgcgcaata tcatgaaaga taagaacacc cccttctgca cacccaacgt     5160
gcagactcgg cggggtcgcg tcaagattga cgaggtgagc cgcatgttcc gcaacaccaa     5220
```

```
tcgctctctt gagtacaaga acctgcccct tcacgattccc agtatgcacc aggtgttaga   5280
tgaggccatc aaagcctgca aaaccatgca ggtgaacaac aagggcatcc agattatcta   5340
cacccgcaat catgaggtga agagtgaggt ggatgcggtg cggtgtcgcc tgggcaccat   5400
gtgcaacctg gccctctcca ctcccttcct catggagcac accatgcccg tgacacatcc   5460
acccgaagtg gcgcagcgca cagccgatgc ttgtaacgaa ggcgtcaagg ccgcgtggag   5520
cctcaaagaa ttgcacaccc accaattatg ccccgttcc tccgattacc gcaacatgat   5580
catccacgct gccacccccg tggacctgtt gggcgctctc aacctgtgcc tgcccctgat   5640
gcaaaagttt cccaaacagg tcatggtgcg catcttctcc accaaccagg gtgggttcat   5700
gctgcctatc tacgagacgg ccgcgaaggc ctacgccgtg gggcagtttg agcagccac   5760
cgagacccct cccgaagacc tggacaccct gagcctggcc atcgaggcag ccatccagga   5820
cctgaggaac aagtctcagt aaaataaagg cgcgccataa aaattttat actagtgtac   5880
cgcggtcgaa tcgatttaat taacgatgct agcattgtcg acgtggtgg cgcggccgcc   5940
agtgtgatgg atatctgcag aattcggctt ggggggctgc aggtggatgc gatcatgacg   6000
tcctctgcaa tggataacaa tgaacctaaa gtactaagaa tggtatatga tgctacaatt   6060
ttacccgaag gtagtagcat ggattgtata aacagacaca tcaatatgtg tatacaacgc   6120
acctatagtt ctagtataat tgccatattg gatagattcc taatgatgaa caaggatgaa   6180
ctaaataata cacagtgtca tataattaaa gaatttatga catacgaaca aatggcgatt   6240
gaccattatg gagaatatgt aaacgctatt ctatatcaaa ttcgtaaaag acctaatcaa   6300
catcacacca ttaatctgtt taaaaaaata aaaagaaccc ggtatgacac ttttaaagtg   6360
gatcccgtag aattcgtaaa aaagttatc ggatttgtat ctatcttgaa caaatataaa   6420
ccggtttata gttacgtcct gtacgagaac gtcctgtacg atgagttcaa atgtttcatt   6480
gactacgtgg aaactaagta tttctaaaat taatgatgca ttaatttttg tattgattct   6540
caatcctaaa aactaaaata tgaataagta ttaaacatag cggtgtacta attgatttaa   6600
cataaaaaat agttgttaac taatcatgag gactctactt attagatata ttctttggag   6660
aaatgacaac gatcaaaccg ggcatgcaag cttgtctccc tatagtgagt cgtattagag   6720
cttggcgtaa tcatggtcat agctgtttcc tgtgtgaaat tgttatccgc tcacaattcc   6780
acacaacata cgagccggaa gcataaagtg taaagcctgg ggtgcctaat gagtgagcta   6840
actcacatta attgcgttgc gctcactgcc cgctttcgag tcgggaaacc tgtcgtgcca   6900
gctgcattaa tgaatcggcc aacgcgcggg gagaggcggt ttgcgtattg ggcgctcttc   6960
cgcttcctcg ctcactgact cgctgcgctc ggtcgttcgg ctgcggcgag cggtatcagc   7020
tcactcaaag gcggtaatac ggttatccac agaatcaggg gataacgcag gaaagaacat   7080
gtgagcaaaa ggccagcaaa aggccaggaa ccgtaaaaag gccgcgttgc tggcgttttt   7140
ccataggctc cgcccccctg acgagcatca caaaaatcga cgctcaagtc agaggtggcg   7200
aaacccgaca ggactataaa gataccaggc gtttccccct ggaagctccc tcgtgcgctc   7260
tcctgttccg accctgccgc ttaccggata cctgtccgcc tttctccctt cgggaagcgt   7320
ggcgctttct catagctcac gctgtaggta tctcagttcg gtgtaggtcg ttcgctccaa   7380
gctgggctgt gtgcacgaac ccccgttca gcccgaccgc tgcgccttat ccggtaacta   7440
tcgtcttgag tccaacccgg taagacacga cttatcgcca ctggcagcag ccactggtaa   7500
caggattagc agagcgaggt atgtaggcgg tgctacagag ttcttgaagt ggtggcctaa   7560
ctacggctac actagaagga cagtatttgg tatctgcgct ctgctgaagc cagttacctt   7620
cggaaaaaga gttggtagct cttgatccgg caaacaaacc accgctggta gcggtggttt   7680
ttttgtttgc aagcagcaga ttacgcgcag aaaaaaagga tctcaagaag atcctttgat   7740
cttttctacg gggtctgacg ctcagtggaa cgaaaactca cgttaaggga tttttggtcat   7800
gagattatca aaaaggatct tcacctagat ccttttaaat taaaaatgaa gttttaaatc   7860
aatctaaagt atatatgagt aaacttggtc tgacagttac caatgcttaa tcagtgaggc   7920
acctatctca gcgatctgtc tatttcgttc atccatagtt gcctgactcc ccgtcgtgta   7980
gataactacg atacgggagg gcttaccatc tggccccagt gctgcaatga taccgcgaga   8040
cccacgctca ccggctccag atttatcagc aataaaccag ccagccggaa gggccgagcg   8100
cagaagtggt cctgcaactt tatccgcctc catccagtct attaattgtt gccgggaagc   8160
tagagtaagt agttcgccag ttaatagttt gcgcaacgtt gttggcattg ctacaggcat   8220
cgtggtgtca cgctcgtcgt ttggtatggc ttcattcagc tccggttccc aacgatcaag   8280
gcgagttaca tgatccccca tgttgtgcaa aaaagcggtt agctccttcg gtcctccgat   8340
cgttgtcaga gtaagttgg ccgcagtgtt atcactcatg gttatggcag cactgcataa   8400
ttctcttact gtcatgccat ccgtaagatg ctttttctgtg actggtgagt actcaaccaa   8460
gtcattctga gaatagtgta tgcggcgacc gagttgctct tgcccggcgt caatacggga   8520
taataccgcg ccacatagca gaactttaaa agtgctcatc attggaaaac gttcttcggg   8580
gcgaaaactc tcaaggatct taccgctgtt gagatccagt tcgatgtaac ccactcgtgc   8640
acccaactga tcttcagcat cttttacttt caccagcgtt tctgggtgag caaaaacagg   8700
aaggcaaaat gccgcaaaaa agggaataag ggcgacacgg aaatgttgaa tactcatact   8760
cttccttttt caatattatt gaagcattta tcagggttat tgtctcatga gcggatacat   8820
atttgaatgt atttagaaaa ataaacaaat aggggttccg cgcacatttc cccgaaaagt   8880
gccacctgac gtctaagaaa ccattattat catgacatta acctataaaa ataggcgtat   8940
cacgaggccc tttcgtctcg cgcgtttcgg tgatgacggt gaaaacctct gacacatgca   9000
gctcccggag acggtcacag cttgtctgta agcggatgcc gggagcagac aagcccgtca   9060
gggcgcgtca gcgggtgttg gcgggtgtcg ggctggctt aactatgcgg catcagagca   9120
gattgtactg agagtgcacc atatgcggtg tgaaataccg cacagatgcg taaggagaaa   9180
ataccgcatc aggcgccatt cgccattcag gctgcgcaac tgttgggaag ggcgatcggt   9240
gcgggcctct tcgctattac gccagctggc gaaaggggga tgtgctgcaa ggcgattaag   9300
ttgggtaacg ccagggtttt cccagtcacg acgttgtaaa acgacggcca gtgaattgga   9360
tttaggtgac actatagaat acgaattc                                     9388

SEQ ID NO: 30       moltype = DNA   length = 8152
FEATURE             Location/Qualifiers
source              1..8152
                    mol_type = other DNA
                    organism = Synthetic construct
SEQUENCE: 30
gaattcgttg tggtcgcca tggatggtgt tattgtatac tgtctaaacg cgttagtaaa   60
acatggcgag gaaataaatc atataaaaaa tgatttcatg attaaaccat gttgtgaaaa   120
```

```
agtcaagaac gttcacattg gcggacaatc taaaaacaat acagtgattg cagatttgcc    180
atatatggat aatgcggtat ccgatgtatg caattcactg tataaaaaga atgtatcaag    240
aatatccaga tttgctaatt tgataaagat agatgacgat gacaagactc ctactggtgt    300
atataattat ttttaaaccta aagatgccat tcctgttatt atatccatag gaaaggatag    360
agatgtttgt gaactattaa tctcatctga taaagcgtgt gcgtgtatag agttaaattc    420
atataaagta gccattcttc ccatggatgt ttcctttttt accaaaggaa atgcatcatt    480
gattattctc ctgtttgatt tctctatcga tgcggcacct ctcttaagaa gtgtaaccga    540
taataatgtt attatatcta gacaccagcg tctacatgac gagcttccga gttccaattg    600
gttcaagttt tacataagta taaagtccga ctattgttct atattatata tggttgttga    660
tggatctgtg atgcatgcaa tagctgataa tagaacttac gcaaatatta gcaaaaatat    720
attagacaat actacaatta acgatgagtg tagatgctgt tattttgaac cacagattag    780
gattcttgat agagatgaga tgctcaatgg atcatcgtgt gatatgaaca gacattgtat    840
tatgatgaat ttacctgatg taggcgaatt tggatctacg atgttgggga aatatgaacc    900
tgacatgatt aagattgctc tttcgatggc tgggtaccag gcgcgcattt cattttgttt    960
ttttctatgc tataaatggt acgtcctgta gaaaccccaa cccgtgaaat caaaaaactc    1020
gacggcctgt gggcattcag tctggatcgc gaaaactgtg gaattgatca gcgttggtgg    1080
gaaagcgcgt tacaagaaag ccgggcaatt gctgtgccag gcagttttaa cgatcagttc    1140
gccgatgcag atattcgtaa ttatgcgggc aactctggt atcagcgcga agtctttata    1200
ccgaaaggtt gggcaggcca gcgtatcgtg ctgcgtttcg atgcggtcac tcattacgcg    1260
aaagtgtggg tcaataatca ggaagtgatg gagcatcagg gcggctatac gccatttgaa    1320
gccgatgtca cgccgtatgt tattgccggg aaaagtgtac gtatcaccgt ttgtgtgaac    1380
aacgaactga actggcagac tatcccgccg ggaatggtca taccgacga aaacggcaag    1440
aaaaagcagt cttacttcca tgatttcttt aactatgccg gaatccatcg cagcgtaatg    1500
ctctacacca cgccgaacac ctgggtggac gatatcaccg tggtgacgca tgtcgcgcaa    1560
gactgtaacc acgcgtctgt tgactggcag gtggtggcca atggtgatgt cagcgttgaa    1620
ctgcgtgatg cggatcaaca ggtggttgca actggacaag gcactagcgg gactttgcaa    1680
gtggtgaatc cgcaccctctg gcaaccgggt gaaggttatc tctatgaact gtgcgtcaca    1740
gccaaaagcc agacagagtg tgatatctac ccgcttcgcg tcggcatccg tcagtggca    1800
gtgaagggcg aacagttcct gattaaccac aaaccgttct actttactgg ctttggtcgt    1860
catgaagatg cggacttgcg tggcaaagga ttcgataacg tgctgatggt gcacgaccac    1920
gcattaatgg actggattgg ggccaactcc taccgtacct cgcattaccc ttacgctgaa    1980
gagatgctcg actgggcaga tgaacatggc atcgtggtga ttgatgaaac tgctgctgtc    2040
ggctttaacc tctcttagg cattggtttc gaagcgggca acaagccgaa agaactgtac    2100
agcgaagagg cagtcaacgg ggaaactcag caagcgcact tacaggcgat taaagagctg    2160
atagcgcgtg acaaaaacca cccaagcgtg gtgatgtgga gtattgccaa cgaaccggat    2220
acccgtccgc aaggtgcacg ggaatatttc gcgccactgg cggaagcaac gcgtaaactc    2280
gacccgacgg tccgatcac ctgcgtcaat gtaatgttct gcgacgctca caccgatacc    2340
atcagcgatc tctttgatgt gctgtgcctg aaccgttatt acggatggta tgtccaaagc    2400
ggcgatttgg aaacggcaga gaaggtactg gaaaaagaac ttctggcctg gcaggagaaa    2460
ctgcatcagc cgattatcat caccgaatac ggcgtggata cgttagccgg gctgcactca    2520
atgtacaccg acatgtggag tgaagagtat cagtgtgcat ggctggatat gtatcaccgc    2580
gtctttgatc gcgtcagcgc cgtcgtcggt gaacaggtat ggaatttcgc cgattttgcg    2640
acctcgcaag gcatattgcg cgttggcggt aacaagaaga gatcttcac tcgcgaccgc    2700
aaaccgaagt cggcggcttt tctgctgcaa aaacgctgga ctggcatgaa cttcggtgaa    2760
aaaccgcagc agggaggcaa acaatgagag ctcggttgtt gatggatctg tgatgcatgc    2820
aatagctgat aatagaactt acgcaaatat tagcaaaaat atattagaca atactacaat    2880
taacgatgag tgtagatgct gttattttga accacagatt aggattcttg atagagatga    2940
gatgctcaat ggatcatcgt gtgatatgaa cagacattg ttattatgatga atttacctga    3000
tgtaggcgaa tttggatcta gtatgttggg gaaatatgaa cctgacatga ttaagattgc    3060
tctttcggtg gctggcggcc cgctcagaa aaattgaaa taaatacaaa ggttcttgag    3120
ggttgttta aattgaaagc gagaaataat cataaataag ccaccaccgt ttaaacggt    3180
gacggtatcg ataagcttga tatcgaattc ctgcagcccg tacgcgcagg cagcatggag    3240
tcgcgcggtc gccgttgtcc cgaaatgata tccgtactgg gtcccatttc ggggcacgtg    3300
ctgaaagccg tgtttagtcg cggcgacacg ccggtgctgc cgcacgagac gcgactcctg    3360
cagacgggta tccacgtgcg cgtgagccag ccctcgctga tcctggtgtc gcagtacacg    3420
cccgactcga cgccatgcca ccgcggcgac aatcagctgc aggtgcagca cacgtacttt    3480
acgggcagcg aggtggagaa cgtgtcggtc aacgtgcaca accccacggg ccggagcatc    3540
tgccccagcc aagagcccat gtcgatctat gtgtacgcgc tgccgctcaa gatgctgaac    3600
atcccagca tcaacgtgca ccactaccc tcggcggcca agcaaaca ccgacacctg    3660
cccgtagctc acgctgtgat tcacgctgcg ggcaagcaga tgtggcaggc gcgtctcacg    3720
gtctcgggac tggcctggac gcgtcagcag aaccagtgga aagagcccga cgtctactac    3780
acgtcagcgt tcgtgtttcc caccaaggac gtggcactgc ggcacgtggt gtgcgcgcac    3840
gagctggttt gctccatgga gaacacgcgc gcaaccaaga tgcaggtgat aggtgaccag    3900
tacgtcaagg tgtacctgga gtccttctgc gaggacgtgc cctccggcag gctctttatg    3960
cacgtcacgc tgggctctga cgtggaagag gacctgacga tgaccgcaa cccgcaaccc    4020
ttcatgcgcc cccacgagcg caacggcttt acggtgttgt gtccaaaaaa tatgataatc    4080
aaaccgggca agatctcgca catcatgctg gatgtggctt ttacctcaca cgagcatttt    4140
gggctgctgt gtcccaagag catcccgggc ctgagcatct caggtaacct attgatgaac    4200
gggcagcaga tcttcctgga ggtgcaagcg atacgcgagg cgtgaact gcgtcagtac    4260
gatcccgtgg ctgcgctctt cttttcgat atcgacttgc tgctgcagcg cgggcctcag    4320
tacagcgaac accccacctt caccagccag tatcgcatcc agggcaagct tgagtaccga    4380
cacacctggg accggcacga cgagggtgcc gcccagggcg acgacgacgt ctggaccagc    4440
ggatcggact ccgacgagga actcgtaacc ccgagcgcag agacgcccg cgttaccggc    4500
gggcggcgca tggcgggta tccacttcc cggggccgca aacgcaaatc agcatcctcg    4560
gcgacggcgt gcacggcggg cgttatgaca cgcggccgcc ttaaggccga gtccaccgtc    4620
gcgcccgaag aggacaccga cgaggattcc gacaacgaaa tccacaatcc ggccgtgttc    4680
acctggccgc cctggcaggc cggcatcctg gcccgcaacc tggtgcccat ggtggctacg    4740
gttcagggtc agaatctgaa gtaccaggag ttcttctggg acgccaacga catctaccgc    4800
atcttcgccg aattggaagg cgtatggcag cccgctcgcg aacccaaacg tcgccgccac    4860
```

```
cggcaagacg ccttgcccgg gccatgcatc gcctcgacgc ccaaaaagca ccgaggttga   4920
tttttatggc gcgccctgca gggaaagttt tataggtagt tgatagaaca aaatacataa   4980
ttttgtaaaa ataaatcact ttttatacta atatgacacg attaccaata cttttgttac   5040
taatatcatt agtatacgct acaccttttc ctcagacatc taaaaaaata ggtgatgatg   5100
caacttttatc atgtaatcga aataatacaa atgactacgt tgttatgagt gcttggtata   5160
aggagcccaa ttccattatt cttttagctg ctaaaagcga cgtcttgtat tttgataatt   5220
ataccaagga taaaatatct tacgactctc catacgatga tctagttaca actatcacaa   5280
ttaaatcatt gactgctaga gatgccggta cttatgtatg tgcattcttt atgacatcgc   5340
ctacaaatga cactgataaa gtagattatg aagaatacac cacagagttg attgtaaata   5400
cagatagtga atcgactata gacataatac tatctggatc tacacattca ccagaaacta   5460
gttaagcttg tctccctata gtgagtcgta ttagagcttg gcgtaatcat ggtcatagct   5520
gtttcctgtg tgaaattgtt atccgctcac aattccacac aacatacgag ccggaagcat   5580
aaagtgtaaa gcctggggtg cctaatgagt gagctaactc acattaattg cgttgcgctc   5640
actgcccgct ttcgagtcgg aaacctgtc gtgccagctg cattaatgaa tcggccaacg   5700
cgcggggaga gcggtttgc gtattgggcg ctcttccgct tcctcgctca ctgactcgct   5760
gcgctcggtc gttcggctgc ggcgagcgg atcagctcac tcaaaggcgg taatacggtt   5820
atccacagaa tcagggata acgcaggaaa gaacatgtga gcaaaaggcc agcaaaaggc   5880
caggaaccgt aaaaaggccg cgttgctggc gtttttcgat aggctccgcc cccctgacga   5940
gcatcacaaa aatcgacgct caagtcagag gtggcgaaac ccgacaggac tataaagata   6000
ccaggcgttt cccctggaa gctccctcgt gcgctctcct gttccgaccc tgccgcttac   6060
cggatacctg tccgcctttc tcccttcggg aagcgtggcg ctttctcata gctcacgctg   6120
taggtatctc agttcggtg aggtcgttcg ctccaagctg ggctgtgtgc acgaaccccc   6180
cgttcagccc gaccgctgcg ccttatccgg taactatcgt cttgagtcca acccggtaag   6240
acacgactta tcgccactgg cagcagccac tggtaacagg attagcagag cgaggtatgt   6300
aggcggtgct acagagttct tgaagtggtg gcctaactac ggctacacta aaggacagt   6360
atttggtatc tgcgctctgc tgaagccagt taccttcgga aaaagagttg gtagctcttg   6420
atccggcaaa caaccaccg ctggtagcgg tggttttttt gtttgcaagc agcagattac   6480
gcgcagaaaa aaaggatctc aagaagatcc tttgatcttt tctacggggt ctgacgctca   6540
gtggaacgaa aactcacgtt aagggatttt ggtcatgaga ttatcaaaaa ggatcttcac   6600
ctagatccttt ttaaattaaa aatgaagttt taaatcaatc taaagtatat atgagtaaac   6660
ttggtctgac agttaccaat gcttaatcag tgaggcacct atctcagcga tctgtctatt   6720
tcgttcatcc atagttgcct gactccccgt cgtgtagata actacgatac gggagggctt   6780
accatctggc cccagtgctg caatgatacc gcgagaccca cgctcaccgg ctccagattt   6840
atcagcaata aaccagccag ccggaagggc cgagcgcaga agtggtcctg caactttatc   6900
cgcctccatc cagtctatta attgttgccg ggaagctaga gtaagtagtt cgccagttaa   6960
tagtttcgc aacgttgttg gcattgctac aggcatcgtg gtgtcacgct cgtcgtttgg   7020
tatggcttca ttcagctccg gttcccaacg atcaagcga gttacatgat cccccatgtt   7080
gtgcaaaaaa gcggttagct ccttcggtcc tccgatcgtt gtcagaagta agttggccgc   7140
agtgttatca ctcatggtta tggcagcact gcataattct cttactgtca tgccatccgt   7200
aagatgcttt tctgtgactg gtgagtactc aaccaagtca ttctgagaat agtgtatgcg   7260
gcgaccgagt tgctcttgcc cggcgtcaat acgggataat accgcgccac atagcagaac   7320
tttaaaagtg ctcatcattg gaaaacgttc ttcggggcga aaactctcaa ggatcttacc   7380
gctgttgaga tccagttcga tgtaacccac tcgtgcaccc aactgatctt cagcatcttt   7440
tactttcacc agcgtttctg ggtgagcaaa aacaggaagg caaaatgccg caaaaaaggg   7500
aataagggcg acacggaaat gttgaatact catactcttc ctttttcaat attattgaag   7560
catttatcag ggttattgtc tcatgagcgg atacatattt gaatgtattt agaaaaataa   7620
acaaataggg gttccgcgca catttccccg aaaagtgcca cctgacgtct aagaaaccat   7680
tattatcatg acattaacct ataaaaatag gcgtatcacg aggccctttc gtctcgcgcg   7740
tttcggtgat gacggtgaaa acctctgaca catgcagctc ccggagacgg tcacagcttg   7800
tctgtaagcg gatgccggga gcagacaagc ccgtcagggc gcgtcagcgg gtgttggcgg   7860
gtgtcgggc tggcttaact atgcggcatc agagcagatt gtactgagag tgcaccatat   7920
gcggtgtgaa ataccgcaca gatgcgtaag gagaaaatac cgcatcaggc gccattcgcc   7980
attcaggctg cgcaactgtt gggaagggcg atcggtgcgg gcctcttcgc tattacgcca   8040
gctggcgaaa gggggatgtg ctgcaaggcg attaagttgg gtaacgccag ggttttccca   8100
gtcacgacgt tgtaaaacga cggccagtga attggattta ggtgacacta ta           8152
```

```
SEQ ID NO: 31          moltype = DNA   length = 2709
FEATURE                Location/Qualifiers
source                 1..2709
                       mol_type = other DNA
                       organism = Synthetic construct
SEQUENCE: 31
atggtcaaac agattaaggt tcgagtggac atggtgcggc atagaatcaa ggagcacatg     60
ctgaaaaaat atacccagac ggaagagaaa ttcactgcg cctttaatat gatgggagga   120
tgtttgcaga atgccttaga tatcttagat aaggttcatg agcctttcga gggagatgaag  180
tgtattgggc taactatgca gagcatgtat gagaactaca ttgtacctga ggataagcgg   240
gagatgtgga tggcttgtat taaggagctg catgatgtga gcaagggcgc cgctaacaag   300
ttgggggggtg cactgcaggc taaggcccgt gctaaaaagg atgaacttag gagaaagatg   360
atgtatatgt gctacaggaa tatagagttc tttaccaaga actcagcctt ccctaagacc   420
accaatggct gcagtcaggc catggcggca ctgcagaact tgcctcagtg ctcccctgat   480
gagattatgc cttatgccca gaaaatattt aagattttgg atgaggagag agacaaggtg   540
ctcacgcaca ttgatcacat atttatggat atcctcacta catgtgtgga acaatgtgt   600
aatgagtaca aggtcactag tgacgcttgt atgatgacca tgtacgggc atctctctct   660
taagtgagtt ctgtcgggtg ctgtgctgct agtcttaga ggactagtt gtgatgctga   720
ccaagcggcc tctgataacc aagcctgagg ttatcagtgt aatgaagcgc gcattgagg   780
agatctgcat gaaggtcttt gcccagtaca ttctgggggc cgatcctctg agagtctgct   840
ctcctagtgt ggatgaccta cgggccatcg ccgaggagtc agatgaggaa gaggctattg   900
tagcctacac tttggccacc gctggtgtca gctcctctga ttctctggtg tcaccccag   960
agtcccctgt acccgcgact atccctctgt cctcagtaat tgtggctgag aacagtgatc   1020
```

```
aggaagaaag tgagcagagt gatgaggaag aggaggaggg tgctcaggag gagcgggagg 1080
acactgtgtc tgtcaagtct gagccagtgt ctgagataga ggaagttgcc ccagaggaag 1140
aggaggatgg tgctgaggaa cccaccgcct ctggaggcaa gagcacccac cctatggtga 1200
ctagaagcaa ggctgaccag ggtgacatcc tcgcccaggc tgtcaatcat gccggtatcg 1260
attccagtag caccggcccc acgctgacaa cccactcttg cagcgttagc agcgccctc  1320
ttaacaagcc gacccccacc agcgtcgcgg ttactaacac tcctctcccc ggggcatccg 1380
ctactcccga gctcagcccg cgtaagaaac cgcgcaaaac cacgcgtcct ttcaaggtga 1440
ttattaaacc gcccgtgcct cccgcgccta tcatgctgcc cctcatcaaa caggaagaca 1500
tcaagcccga gcccgacttt accatccagt accgcaacaa gattatcgat accgccggct 1560
gtatcgtgat ctctgatagc gaggaagaac agggtgaaga agtcgaaacc cgcggtgcta 1620
ccgcgtcttc cccttccacc ggcagcggca cgccgcgagt gacctctccc acgcacccgc 1680
tctcccagat gaaccaccct cctcttcccg atcccttggg ccggcccgat gaagatagtt 1740
cctcttcgtc ttcctcctcc tgcagttcgg cttcggactc ggagagtgag tccgaggaga 1800
tgaaatgcag cagtggcgga ggagcatccg tgacctcgga ccaccatggg ggcgcgggtt 1860
ttggtggcgc ggcctcctcc tctctgctga gctgcggcca tcagagcagc ggcggggcga 1920
gcaccggacc ccgcaagaag aagagcaaac gcatctccga gttggacaac gagaaggtgc 1980
gcaatatcat gaaagataag aacaccccct tctgcacacc caacgtgcag actcggcggg 2040
gtccgcgtca agattgacga ggtgagccgc atgttccgca acaccaatcg ctctcttgag 2100
tacaagaacc tgcccttcac gattcccagt atgcaccagt tgttagatga ggccatcaaa 2160
gcctgcaaaa ccatgcaggt gaacaacaag ggcatccaga ttatctacac ccgcaatcat 2220
gaggtgaaga gtgaggtgga tgcggtgcgg tgtcgcctgg gcaccatgtg caacctggcc 2280
ctctccactc ccttcctcat ggagcacacc atgcccgtga ccatccacc cgaagtggcg 2340
cagcgaacag ccgatgcttg taacgaaggc gtcaaggccg cgtggagcct caaagaattg 2400
cacacccacc aattatgccc ccgttcctcc gattaccgca acatgatcat ccacgctgcc 2460
accccgtgg  acctgttggg cgctctcaac ctgtgcctgc ccctgatgca aaagtttccc 2520
aaacaggtca tggtgcgcat cttctccacc aaccagggtg ggttcatgct gcctatctac 2580
gagacggccg cgaaggccta cgccgtgggg cagtttgagc agcccaccga gaccccctccc 2640
gaagacctgg acaccctgag cctggccatc gaggcagcca tccaggacct gaggaacaag 2700
tctcagtaa                                                        2709
```

USE OF TRIPLEX CMV VACCINE IN CAR T CELL THERAPY

CROSS REFERENCE TO RELATED APPLICATIONS

This application is a continuation of U.S. application Ser. No. 17/572,496, filed on Jan. 10, 2022, which is a continuation of U.S. application Ser. No. 17/006,758, filed on Aug. 28, 2020, which is a continuation of U.S. application Ser. No. 16/343,701, filed on Apr. 19, 2019, which is a National Stage application under 35 U.S.C. § 371 of International Application No. PCT/US2017/057433, filed on Oct. 19, 2017, which claims the benefit of U.S. Provisional Application No. 62/410,372, filed on Oct. 19, 2016. The disclosures of the prior applications are incorporated by reference in their entirety.

STATEMENT OF FEDERALLY SPONSORED RESEARCH

This invention was made with government support under CA107399, CA030206, and CA077544, awarded by the National Institutes of Health. The government has certain rights in the invention.

SEQUENCE LISTING

This application contains a Sequence Listing that has been submitted electronically as an XML file named 40056-0030004_SL_ST26.xml. Said XML file, created on Jul. 18, 2023, is 48,263 bytes in size, and is hereby incorporated by reference in its entirety.

BACKGROUND

Tumor-specific T cell based immunotherapies, including therapies employing engineered T cells, have been investigated for anti-tumor treatment. In some cases, the T cells used in such therapies do not remain active in vivo for a long enough period.

Over 70,000 new cases of non-Hodgkin lymphoma (NHL) are diagnosed each year in the United States with about 20,000 deaths due to NHL each year, representing the 5th leading cause of cancer deaths. The majority of these patients have widespread disease at the time of diagnosis and over two-thirds will suffer a recurrence after remission induction with cytotoxic chemotherapy and rituximab. Efforts to improve the survival of patients with recurrent lymphoma have focused mainly on the use of autologous hematopoietic cell transplant (HCT), which is curative in approximately half of good-risk patients, but confers a less than 15% 5-year event-free survival in patients with poor prognostic features. Allogeneic HCT provides a tumor-free stem cell graft, cells that have not been damaged by prior chemotherapy and the opportunity for graft-versus-lymphoma (GVL) effect, and has been increasingly applied in patients with relapsed NHL. Although relapse rates are improved over autologous HCT, allogeneic HCT is associated with both significant risks of transplant-related complications and also disease recurrence. Thus, there is an important need for the development of new therapies that can consolidate the tumor cytoreduction achieved with autologous or allogeneic HCT by eradicating the limited number of tumor cells surviving after autologous myeloablative and reduced intensity allogeneic conditioning. A Phase I clinical trial using ex vivo-expanded autologous central memory-enriched T cells (TCM) transduced with lentivirus expressing CD19-specific CAR has demonstrated the data safety and feasibility of CD19 CAR T cell therapy after HCT Wang et al., *Blood* 127:2980, 2016).

SUMMARY

Described herein is the use of a cytomegalovirus (CMV) Triplex Vaccine in combination with engineered T cells that both recognize a CMV antigen and express a chimeric antigen receptor target to an antigen expressed on normal B cells as well as on cancerous cells (CMV/CAR T cells) to treat a variety of cancers. The methods entail administering CMV/CAR T cells which recognize a tumor antigen (e.g., CD19) in addition to a CMV antigen to a patient. Subsequent to administration of the CMV/CAR T cells, a CMV Triplex Vaccine is administered to the patient. The vaccine can promote proliferation of the CMV/CAR T cells and enhance their anti-tumor activity. Thus, the methods can improve T cell resistance and provide a means by which to re-stimulate CAR T cells after relapse. In addition, the methods can provide more reliable engraftment and persistence in a low target-antigen setting (e.g., post-myeloablative HCT) with re-expansion of CAR T cells by CMV vaccine administration. The methods described herein also permit in vivo expansion of CMV-specific CAR T cells, instead of or in addition to ex vivo expansion, avoiding excessive T cell exhaustion that results in some cases from ex vivo manufacturing.

The CMV/CAR T cells can be prepared by a method comprising: (a) providing PBMC from a cytomegalovirus (CMV)-seropositive human donor; (b) exposing the PBMC to at least one CMV antigen (e.g., pp65 or a mixture of IE1/IE2 overlapping peptides); (c) treating the exposed cells to produce a population of cells enriched for stimulated cells specific for CMV (e.g., treating them to create a population of cells that is enriched for stimulated cells specific for CMV relative to the untreated population of cells); (d) transducing at least a portion of the enriched population of cells with a vector (e.g., a lentiviral vector) expressing a CAR, thereby preparing T cells specific for CMV and expressing a CAR. In some cases, a CMV vaccine, for example, the CMV Triplex Vaccine, can be administered to the donor prior to harvest of the PBMC in order to increase the frequency of CMV-positive T cells.

The CMV Triplex Vaccine is a recombinant MVA expressing a fusion protein of two CMV antigens, IE1-exon4 and IE2-exon5 and CMV antigen pp65. The sequence encoding the fusion protein is inserted in the MVA deletion-II locus and the sequence encoding the CMV pp65 antigen is inserted into the MVA deletion-III locus. The CMV Triplex Vaccine is described in greater detail in U.S. Pat. No. 8,580,276, hereby incorporated by reference.

The methods described herein include: a method for treating a patient comprising: (a) providing a composition comprising a population of T cells expressing both a chimeric antigen receptor (CAR) and a T cell receptor specific for a cytomegalovirus (CMV) antigen; (b) administering the composition to the patient; and (c) administering to the patient a viral vector encoding: (i) CMV pp65 and (ii) a fusion protein comprising exon 4 of CMV protein IE1 (e4) and exon 5 of CMV protein IE2 (e5) either prior to or subsequent to administering the composition comprising a population of T cells to the patient.

Described herein is a method for treating a patient comprising: (a) providing a composition comprising a population of T cells expressing both a chimeric antigen receptor (CAR) and a T cell receptor specific for a cytomegalovirus (CMV) antigen; (b) administering the composition to the patient; and (c) administering to the patient a viral vector encoding: (i) CMV pp65 and (ii) a fusion protein comprising exon 4 of CMV protein IE1 (e4) and exon 5 of CMV protein IE2 (e5) either prior to or subsequent to administering the composition comprising a population of T cells to the patient.

In various embodiments: the step of administering a viral vector to the patient comprises administering recombinant MVA virus; expression of (i) CMV pp65 and (ii) the fusion protein comprising exon 4 of CMV protein IE1 (e4) and exon 5 of CMV protein IE2 (e5) is under the control of mH5 promoter; the patient is immunocompromised; the patient is immunocompetent; the patient is CMV-seronegative prior to treatment; the patient is CMV-seropositive prior to treatment; the patient received hematopoietic stem cells (HSC) from a CMV-positive or CMV-negative donor prior to administering the comprising a population of T cells expressing both a chimeric antigen receptor (CAR) and a T cell receptor specific for a cytomegalovirus (CMV) antigen; and the CAR is targeted to CD19; administration of the viral vector occurs at least 5 days after treatment with the composition comprising a population of T cells; the viral vector is administered to the patient both prior to and subsequent to the administration of the composition comprising a population of T cells; the viral vector is administered to the hematopoietic stem cell donor prior to harvesting the stem cells; the viral vector is administered to the patient only prior to the administration of the composition comprising a population of T cells; the viral vector is administered to the patient only subsequent to the administration of the composition comprising a population of T cells; the viral vector is administered to the patient at least four times; the patient is suffering from non-Hodgkin's Lymphoma.

The CAR is selective can be selective for any antigen, for example: CD19, CS1, CD123, 5T4, 8H9, αvβ6 integrin, alphafetoprotein (AFP), B7-H6, CA-125 carbonic anhydrase 9 (CA9), CD19, CD20, CD22, CD30, CD33, CD38, CD44, CD44v6, CD44v7/8, CD52, CD123, CD171, carcionoembryonic antigen (CEA), EGFrvIII, epithelial glycoprotein-2 (EGP-2), epithelial glycoprotein-40 (EGP-40), ErbB1/EGFR, ErbB2/HER2/neu/EGFR2, ErbB3, ErbB4, epithelial tumor antigen (ETA), FBP, fetal acetylcholine receptor (AchR), folate receptor-α, G250/CAIX, ganglioside 2 (GD2), ganglioside 3 (GD3), HLA-A1, HLA-A2, high molecular weight melanoma-associated antigen (HMW-MAA), IL-13 receptor α2, KDR, k-light chain, Lewis Y (LeY), L1 cell adhesion molecule, melanoma-associated antigen (MAGE-A1), mesothelin, Murine CMV infected cella, mucin-1 (MUC1), mucin-16 (MUC16), natural killer group 2 member D (NKG2D) ligands, nerve cell adhesion molecule (NCAM), NY-ESO-1, Oncofetal antigen (h5T4), prostate stem cell antigen (PSCA), prostate-specific membrane antigen (PSMA), receptor-tyrosine kinase-like orphan receptor 1 (ROR1), TAA targeted by mAb IgE, tumor-associated glycoprotein-72 (TAG-72), tyrosinase, and vascular endothelial growth factor (VEGF) receptors.

In certain embodiments: the CAR is selective for an antigen selected from: CD19, CD123, CS1, BCMA, CD44v6, CD33, CD22, IL-13α2, PSA, HER-2, EGFRv3, CEA, and C7R; the CAR comprises: a scFv selective for the selected non-CMV antigen; a hinge/linker region; a transmembrane domain; a co-signaling domain; and CD3 ζ signaling domain; the co-signaling domain is selected from a CD28 co-signaling domain and a 4-IBB co-signaling domain; transmembrane domain is selected from a CD28 transmembrane domain and a CD4 transmembrane domain.

In various embodiments of the treatment method: the population of human T cells is autologous to the patient; the population of human T cells is allogeneic to the patient; the method reduces the risk of CMV infection; the method reduces CMV viremia and/or disease; the patient was CMV-immune prior to treatment and the method reduces the risk of CMV infection; the patient was not CMV-immune prior to treatment and the method reduces CMV viremia or disease.

In some embodiments, the step of providing a population of T cells expressing a CAR and a T cell receptor specific for a CMV antigen comprises: (a) providing PBMC or a T cell subpopulation from a CMV-seropositive human donor; (b) exposing the PBMC or the T cell subpopulation to at least one CMV antigen; (c) treating the exposed cells to produce a population of cells enriched for stimulated cells specific for CMV; (d) transducing at least a portion of the enriched population of cells with a vector expressing a CAR. In some embodiments, the step of treating the exposed cells to produce a population of cells enriched for stimulated cells specific for CMV comprises treating the stimulated cells to produce a population of cells enriched for cells expressing an activation marker.

In some embodiments, the step of providing a population of T cell expressing a CAR and a T cell receptor specific for a CMV antigen comprises: (a) administering a viral vector encoding: (i) CMV pp65 and (ii) a fusion protein comprising exon 4 of CMV protein IE1 (e4) and exon 5 of CMV protein IE2 (e5) to a human donor to convert a CMV-seronegative human donor to one containing T cells responsive to CMV antigens pp65, IE1 and IE2; (b) obtaining PBMC from the CMV-seropositive human donor; (c) exposing the PBMC to at least one CMV antigen; (d) treating the exposed cells to produce a population of cells enriched for stimulated cells specific for CMV; (e) transducing at least a portion of the enriched population of cells with a vector expressing a CAR, thereby providing a population of T cell expressing a CAR and a T cell receptor specific for a CMV antigen.

In some embodiments, the step of providing a population of T cell expressing a CAR and a T cell receptor specific for a CMV antigen comprises: (a) administering a viral vector encoding: (i) CMV pp65 and (ii) a fusion protein comprising exon 4 of CMV protein IE1 (e4) and exon 5 of CMV protein IE2 (e5) to a CMV-positive human donor; (b) obtaining PBMC from the CMV-seropositive human donor; (b) exposing the PBMC to at least one CMV antigen; (c) treating the exposed cells to produce a population of cells enriched for stimulated cells specific for CMV; (d) transducing at least a portion of the enriched population of cells with a vector expressing a CAR, thereby providing a population of T cell expressing a CAR and a T cell receptor specific for a CMV antigen.

In the case of patients who have received HSC transplant, in some embodiments, the viral vector is administered to the patient or the hematopoietic stem cell transplant donor at least twice subsequent to the administration of the composition comprising a population of T cells, the hematopoietic stem cells were autologous to the patient; and the hematopoietic stem cells were allogenic to the patient.

Also described is a method for preparing T cells expressing a CAR and a T cell receptor specific for a CMV antigen, the method comprising: (a)) administering a viral vector encoding: (i) CMV pp65 and (ii) a fusion protein comprising exon 4 of CMV protein IE1 (e4) and exon 5 of CMV protein IE2 (e5) to a CMV-positive human donor; (b) obtaining PBMC from the CMV-seropositive human donor; (b) exposing the PBMC to at least one CMV antigen; (c) treating the exposed cells to produce a population of cells enriched for stimulated cells specific for CMV; (d) transducing at least a portion of the enriched population of cells with a vector expressing a CAR, thereby providing a population of T cell expressing a CAR and a T cell receptor specific for a CMV antigen.

Also described is a method for preparing T cells expressing a CAR and a T cell receptor specific for a CMV antigen, the method comprising: a)) administering a viral vector encoding: (i) CMV pp65 and (ii) a fusion protein comprising exon 4 of CMV protein IE1 (e4) and exon 5 of CMV protein IE2 (e5) to a CMV-positive human donor; (b) obtaining PBMC from the CMV-seropositive human donor; (b) exposing the PBMC to at least one CMV antigen; (c) treating the exposed cells to produce a population of cells enriched for stimulated cells specific for CMV; (d) transducing at least a portion of the enriched population of cells with a vector expressing a CAR, thereby providing a population of T cell expressing a CAR and a T cell receptor specific for a CMV antigen.

In various embodiments of the of the methods for producing T cells, the method further comprises expanding the population of T cell expressing a CAR and a T cell receptor specific for a CMV antigen.

In various embodiments of the of the methods for producing T cells: the activation marker is IFN-γ or other activation marker such as CD137, CD107 or other cytokines; the CMV antigen is pp65 protein or an antigenic portion thereof, the CMV antigen comprises two or more different antigenic CMV pp65 peptides; the step of transducing the enriched population of cells does not comprise CD3 stimulation; the step of transducing the enriched population of cells does not comprise CD28 stimulation; the step of transducing the enriched population of cells does not comprise CD28 stimulation or CD3 stimulation; the step of transducing the enriched population of cells does not comprise exposing the cells to an anti-CD28 antibody or an anti-CD3 antibody; the enriched population of cells is at least 40% IFN-γ positive, at least 20% CD8 positive, and at least 20% CD4 positive; the enriched population of cells are cultured for fewer than 10 days prior to the step of transducing the enriched population of cells with a vector encoding a CAR; the method further comprises expanding the CMV specific T cells expressing a CAR cells by exposing them to an antigen that binds to the CAR; the step of expanding the CMV-specific T cells expressing a CAR comprises exposing the cells to T cells expressing the antigen that binds the CAR; and the expansion takes place is the presence of at least one exogenously added interleukin.

In some cases, the method includes a step of preparing T cells specific for cytomegalovirus (CMV) and expressing a chimeric antigen receptor (CAR), the method comprising: (a) providing T cells (e.g., PBMC) from a cytomegalovirus CMV seropositive human donor; (b) exposing the PBMC to at least one CMV antigen; (c) treating the exposed cells to produce a population of cells enriched for stimulated cells specific for CMV; (d) transducing at least a portion of the enriched population of cells with a vector expressing a CAR, thereby preparing T cells specific for CMV and expressing a CAR. In various cases: the step of treating the exposed cells (e.g., using a selection step) to produce a population of cells enriched for stimulated cells specific for CMV comprises treating the stimulated cells to produce a population of cells enriched for cells expressing an activation marker (e.g., IFN-γ of IL-13); the PBMC are cultured for less than 5 days (less than 4, 3, 2, 1 days) prior to exposure to the CMV antigen; the cells are exposed to the CMV antigen for fewer than 3 days (fewer than 48 hrs, 36 hrs, 24 hrs) the CMV antigen is pp65 protein or an antigenic portion thereof, the CMV antigen comprises two or more different antigenic CMV pp65 peptides; the step of transducing the enriched population of cells does not comprise CD3 stimulation; the step of transducing the enriched population of cells does not comprise CD28 stimulation; the step of transducing the enriched population of cells does not comprise CD3 stimulation or CD28 stimulation; the enriched population of cells is at least 40% (e.g., 50%, 60%, 70%) IFN-γ positive, at least 20% (e.g., 25%, 30%, 35%) CD8 positive, and at least 20% (e.g., 25%, 30%, 35%) CD4 positive; the enriched population of cells are cultured for fewer than 10 (fewer than 9, 8, 7, 5, 3, 2) days prior to the step of transducing the enriched population of cells with a vector encoding a CAR. In some cases, the T cells are from a CMV positive donor and are exposed to a CMV antigen such as CMV pp65 or a mixture of CMV protein peptides (for example 10-20 amino acid peptides that are fragments of pp65) in the presence of IL-2 to create a population of stimulated cells. In some cases, the population of stimulated cells is treated to prepare a population of cells that express IFN-γ. In some cases, the CMV/CAR T cells do not recognize an antigen from a second virus. For example, they do not recognize an Epstein-Barr virus antigen or an influenza virus antigen or an Adenovirus antigen.

In some cases, the method further comprises expanding the CMV specific T cells expressing a CAR (CMV/CAR T cells) by exposing them an antigen that binds to the CAR.

In some cases, the CMV/CAR T cells are not expanded ex vivo by exposure to an antigen that binds the CAR, by a CMV antigen or by exposure to exogenously added cytokines.

In some cases, the step of expanding the CMV-specific T cells expressing a CAR comprises exposing the cells to T cells expressing the antigen that bind the CAR (e.g., the expansion takes place is the presence of at least one exogenously added interleukin (e.g., one or both of IL-1 and IL-15) and a T cell expressing the antigen recognized by the CAR.

In various cases: the CAR is selective for an antigen selected from: CD19, CS1, CD123, 5T4, 8H9, αvβ6 integrin, alphafetoprotein (AFP), B7-H6, CA-125 carbonic anhydrase 9 (CA9), CD19, CD20, CD22, CD30, CD33, CD38, CD44, CD44v6, CD44v7/8, CD52, CD123, CD171, carcionoembryonic antigen (CEA), EGFrvIII, epithelial glycoprotein-2 (EGP-2), epithelial glycoprotein-40 (EGP-40), ErbB1/EGFR, ErbB2/HER2/neu/EGFR2, ErbB3, ErbB4, epithelial tumor antigen (ETA), FBP, fetal acetylcholine receptor (AchR), folate receptor-α, G250/CAIX, ganglioside 2 (GD2), ganglioside 3 (GD3), HLA-A1, HLA-A2, high molecular weight melanoma-associated antigen (HMW-MAA), IL-13 receptor α2, KDR, k-light chain, Lewis Y (LeY), L1 cell adhesion molecule, melanoma-associated antigen (MAGE-A1), mesothelin, Murine CMV infected cella, mucin-1 (MUC1), mucin-16 (MUC16), natural killer group 2 member D (NKG2D) ligands, nerve cell adhesion molecule (NCAM), NY-ESO-1, Oncofetal antigen (h5T4), prostate stem cell antigen (PSCA), prostate-specific membrane antigen (PSMA), receptor-tyrosine kinase-like orphan receptor 1 (ROR1), TAA targeted by mAb IgE, tumor-associated glycoprotein-72 (TAG-72), tyrosinase, and vascular endothelial growth factor (VEGF) receptors.

In some cases, the CAR is selective for an antigen selected from: CD19, CD123, CS1, BCMA, CD44v6, CD33, CD22, IL-13α2, PSA, HER2, EGFRv3, CEA, and C7R.

In some cases: the CAR comprises: a scFv selective for the selected non-CMV antigen; a hinge/linker region; a transmembrane domain; a co-signaling domain; and CD3 ζ signaling domain; the chimeric antigen receptor further comprises a spacer sequence located between the co-signaling domain and the CD3ζ signaling domain; the co-signaling domain is selected from a CD28 co-signaling domain and a 4-IBB co-signaling domain; the transmembrane domain is selected from a CD28 transmembrane domain and a CD4 transmembrane domain; the vector expressing the CAR expresses a truncated human EGFR from the same transcript encoding the CAR, wherein the truncated human EGFR lacks a EGF ligand binding domain and lacks a cytoplasmic signaling domain; the spacer sequence comprises or consists of 3-10 consecutive Gly; the hinge/linker region comprises at least 10 amino acids of an IgG constant region or hinge region; the IgG is IgG4; the hinge/linger region comprises an IgG4 CD3 domain; the hinge/linger region comprises an IgG4 Fc domain or a variant thereof, the hinge/linker region comprises or consists of 4-12 amino acids; and hinge/linker region is selected from the group consisting of: the sequence ESKYGPPCPPCPGGGSSGGGSG and the sequence GGGSSGGGSG.

In some cases, the CMV/CAR T cell population is a population in which at least 20% of the cells in the population are CD4+, in which at least 20% of the cells in the population are CD8+, or in which at least 60% of the cells in the population are IFNγ+.

In various cases: the T cells are specific for CMV pp65; and the CAR binds an antigen selected from: CD19, CD123, CS1, BCMA, CD44v6, CD33, CD22, IL-13α2, PSA, HER2, EGFRv3, CEA, and C7R.

Also described is a method of treating a patient suffering from cancer comprising administering a composition comprising CMV/CAR T cells followed by administration of CMV Triplex Vaccine. In various cases: the population of human T cells are autologous to the patient; the population of human T cells are allogenic to the patient; the population of human T cells are autologous to the patient; the method further comprises administering to the patient at least two or at least three doses of a CMV Triplex Vaccine.

An amino acid modification refers to an amino acid substitution, insertion, and/or deletion in a protein or peptide sequence. An "amino acid substitution" or "substitution" refers to replacement of an amino acid at a particular position in a parent peptide or protein sequence with another amino acid. A substitution can be made to change an amino acid in the resulting protein in a non-conservative manner (i.e., by changing the codon from an amino acid belonging to a grouping of amino acids having a particular size or characteristic to an amino acid belonging to another grouping) or in a conservative manner (i.e., by changing the codon from an amino acid belonging to a grouping of amino acids having a particular size or characteristic to an amino acid belonging to the same grouping). Such a conservative change generally leads to less change in the structure and function of the resulting protein. The following are examples of various groupings of amino acids: 1) Amino acids with nonpolar R groups: Alanine, Valine, Leucine, Isoleucine, Proline, Phenylalanine, Tryptophan, Methionine; 2) Amino acids with uncharged polar R groups: Glycine, Serine, Threonine, Cysteine, Tyrosine, Asparagine, Glutamine; 3) Amino acids with charged polar R groups (negatively charged at pH 6.0): Aspartic acid, Glutamic acid; 4) Basic amino acids (positively charged at pH 6.0): Lysine, Arginine, Histidine (at pH 6.0). Another grouping may be those amino acids with phenyl groups: Phenylalanine, Tryptophan, and Tyrosine.

DESCRIPTION OF DRAWINGS

FIGS. 1A-1D depict the development of clinically feasible platform for derivation of CMV/CAR T cells and the schematic structure of a lentiviral vector expressing a CD19 CAR. (A) CMV-specific T cells from CMV immune HLA A2 donors were selected using IFNγ capture after overnight stimulation with cGMP grade CMVpp65 protein. After selection, the cells were stained with antibodies specific to IFNγ, CD4, and CD8. The frequency of each population is presented after exclusion of dead cells with DAPI. (B) The selected cells were transduced with the second generation CD19CAR with a double mutation in the spacer, 24 hours after the IFNγ capture. 7-10 days later, the transduced cells were stimulated with irradiated CD19 expressing NIH3T3 cells at 10:1 ratio (3T3:T cells) and the stimulation was repeated 7 days post the first stimulation. CAR expression was defined by cetuximab-biotin and streptavidin (SA) APC-Cy7 staining. Percentages of CART cells are indicated in each histogram (filled gray), and based on subtraction of that stained with SA-APC-Cy7 alone (black line). (C) Growth of total cell number was determined by Guava Viacount at different time points. (D) Schematic diagram of 10039 nt lentiviral vector encoding a CD19 CAR. Within the 3183 nucleotide long CD19R:CD28:z(CO)-T2A-EGFRt construct, the CD19-specific scFv, IgG4 Fc spacer, the CD28 transmembrane and cytoplasmic signaling domains, three-glycine linker, and CD3z cytoplasmic signaling domains of the CD19R:CD28:z(CO) CAR containing the 2 point mutations, L235E and N297Q, in the CH2 portion of the IgG4 spacer (CD19R(EQ)), as well as the T2A ribosome skip and truncated EGFR sequences are indicated. The human GM-CSF receptor alpha signal sequences that drive surface translocation of the CD19R:CD28:z(CO) CAR and EGFRt are also indicated.

FIGS. 3A-3C depicts the mH5-IEfusion-pZWIIA (GUS) plasmid DNA sequence (SEQ ID NO: 29).

FIGS. 4A-4C depicts the mH5-pp65-pLW51 (GUS) plasmid DNA sequence (SEQ ID NO: 30).

FIGS. 5A-5C depicts an IE1 antigen and the IE2 antigen fusion protein (SEQ ID NO: 31).

DETAILED DESCRIPTION

Figure 2A:
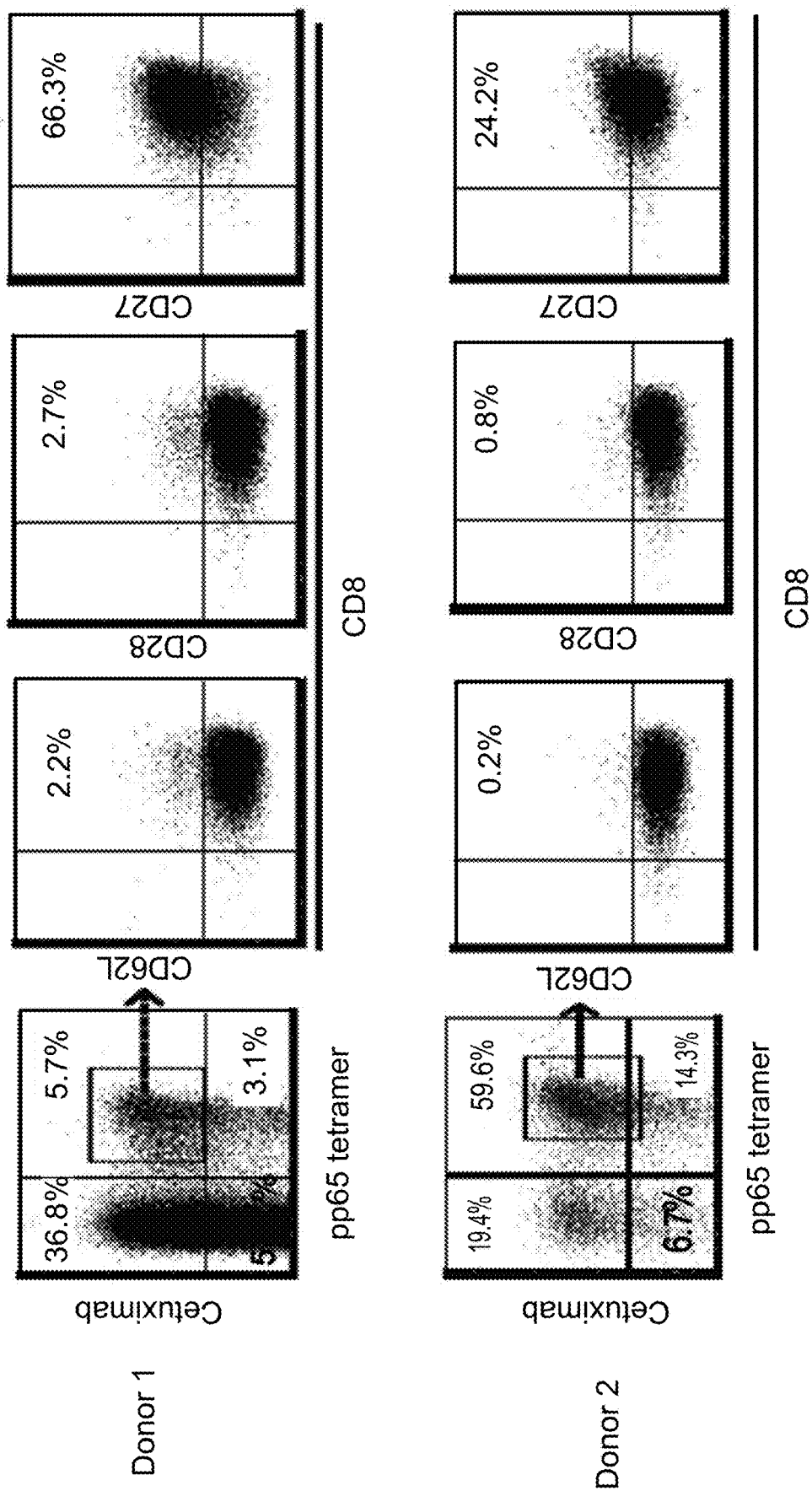
FIGS. 2A-2C depict the results of studies demonstrating that CMV/CAR T cells exhibit specific effector function after engagement with CD19+ and CMVpp65+ tumors. (A) 7 days after the second CD19 Ag stimulation, T cells were stained with HLA A2 restricted pp65 tetramer, cetuximab-biotin, anti-CD8 and antibodies specific to central memory T cell surface markers. Percent positive cells are indicated after dead cell exclusion with DAPI, gating based on pp65 tetramer and cetuximab double-positivity, and isotype-matched stained samples. (B) Four-hour $^{51}$Cr release assays were performed using the CMV/CAR T cells and indicated $^{51}$Cr-labeled target cells at different effector:target (E:T) ratios. OKT3-expressing LCLs were used as positive controls, KG1A and U251T as negative controls. CD19+ LCL and engineered pp65U251T cells were used as target for CD19 and CMV-specific T cells, respectively. Data from a representative donor is presented. (C) CMV/CAR T cells ($10^5$) were activated overnight with $10^5$ LCL-OKT3, LCL, or KG1a in 96-well tissue culture plates and $10^5$ U251T and engineered pp65 expressing U251T cells (pp65U251T) in 24-well tissue culture plates. Supernatants were collected after overnight co-incubation of CMV/CAR T cells and stimulators. Cytokine levels with indicated stimulators (means±SEM of triplicate wells) were determined using cytometric bead array.

Described below are T cells specific for CMV and CD19. These CMV/CAR T cells were generated using a rapid and efficient method for generating and selecting CMV-specific T cells. The method, which employs IFNγ capture of CMV-specific T cells, consistently and efficiently enriched CMV-specific T cells while preserving the broad spectrum of CMV repertoires. Moreover, the cells remained amenable to gene modification after a brief CMVpp65 stimulation, avoiding the need for CD3/CD28 bead activation prior to transduction. This is significant because CD3/CD28 activation can cause activation-induced cell death (AICD) of CMV-specific T cells. Engineering the bulk IFNγ-captured T cells with a CD19CAR lentivirus followed by stimulation with CD19 antigen resulted in 50 to 70% of the CAR+ T cells responding to pp65 stimulation, representing the subset of functional CMV/CAR T cells. The CMV/CAR T cells exhibited specific cytolytic activity and secreted IFNγ, as well as proliferating vigorously after engagement of endogenous CMVpp65 T cell receptors or engineered CD19 CARs. Upon transfer into tumor bearing mice, the CMV/CAR T cells mediated cytokine released syndrome (CRS), which has been found to correlate with anti-tumor efficacy in the clinic.

While the CMV/CAR T cells described herein express a CAR targeted to CD19, the same methods can be used to generate CMV CAR T cells targeted to any desired antigen.

Efficient in vivo activation of virus-specific T cells through the TCR demands that viral antigens are processed and presented in a human leukocyte antigen (HLA)-dependent manner. This can be achieved by administering CMV Triplex Vaccine to the patient subsequent to administration of the CMV/CAR T cells.

The antitumor activity of CMV/CAR T cells can be enhanced as a consequence of proliferation following CMV peptide vaccination. This suggests that the cell dose of CMV/CAR T cells could be significantly decreased as compared to conventional CAR T cells, due to their potential to proliferate in vivo in response to vaccine, avoiding prolonged culture times and the risk of terminal differentiation.

In some cases, such as in the CMV/CAR T cells targeted to CD19 described herein, the CMV/CAR T cells also express a truncated EGFR (EGFRt). Cells expressing EGFRt can be killed by administration of an antibody, such a cetuximab, targeted to EGFR. This permits control and reduction of potential on/off-target toxicity.

The administration of CMV Triplex Vaccine subsequent to treatment with CMV/CD19 CAR T cells can augment the antitumor activity of adoptively transferred CMV/CD19 CAR T cells in several scenarios: 1) to salvage patients not achieving complete remission or relapsing after CAR T cell therapy, 2) vaccine boost when CD19 CAR T cells are failing to persist regardless of tumor responses at that time, 3) planned vaccination on days post-administration CD19 CAR T cells. There is also potential benefit of using the CMV/CAR T cells pre-emptively post-allogeneic HCT, both to eliminate minimal residual disease (MRD) and control CMV, potentially preventing reactivation of virus or undergoing expansion in response to latent CMV reactivation.

Moreover, administration of CMV Triplex Vaccine has the potential to profoundly impact the general field of adoptive T cell therapy, since by transducing a variety of tumor-directed CARs into CMV-specific T cells, it is possible to tailor this strategy to a wide range of malignancies and tumor targets.

Triplex Vaccine

CMV Triplex Vaccine is a recombinant MVA that expresses three CMV antigens, i.e., at least a portion or Immediate-Early Gene-1 (IE1), at least a portion of Immediate-Early Gene-2 (IE2) and at least a portion of pp65. The IE1 antigen and the IE2 antigen can be expressed a fusion protein, for example, a protein encoded by the nucleotide sequence of SEQ ID NO: C. Expression of the CMV antigens can be under the control of a modified H5 (mH5) promoter. A CMV Triplex Vaccine is fully described in U.S. Pat. No. 8,580,276 and in Wang et al. (*Vaccine* 28:1547, 2010)

The CMV Triplex Vaccine can express CMV pp65 and an CMV IE fusion protein (IEfusion). The IEfusion can include an antigenic portion of IE1 (e.g., Exon 4) and an antigenic portion of 1E2 (e.g., Exon 5), wherein the antigenic portions elicit an immune response when expressed by a vaccine. In one aspect, the IEfusion is has the sequence encoded by SEQ ID NO: C or another nucleotide sequence that encodes the same amino acid sequence as SEQ ID NO: C.

As explained in U.S. Pat. No. 8,580,276, the CMV Triplex Vaccine includes three of the best recognized antigens in the CD8 subset: pp65, IE1, and IE2. There is no region of homology greater than 5 amino acids between the major exons of both proteins. Individually, both antigens are recognized broadly by almost 70% of the general population (Sylwester et al. 2005). The divergent sequence of both IE1/e4 and IE2/e5 used here predicts an entirely different subset of HLA binding peptides using publicly available Class I and II motif algorithms (Peters and Sette 2007). Human subjects that were evaluated for recognition of both IE1 and IE2 antigens were found in many instances to recognize one or the other but not both. Among the research subjects analyzed, 24% recognized IE2 with or without pp65 to the exclusion of IE1. This result strongly suggests that the recognition elements for both antigens are unique, and by including both of them in the vaccine, the breadth of individuals with disparate HLA types that will recognize and develop an immune response to the vaccine is extended. The fusion of major exons from both antigens achieves the dual goal of reducing the number of separate inserts and eliminating the need for a third insert promoter. The advantages of this approach include placement of all vaccine antigens in one vector, and diminishing the dose of virus needed to attain sufficient immunity simultaneously against all of the included antigens.

Also as explained in U.S. Pat. No. 8,580,276, prior to conducting experiments with rMVA in clinical samples, the capacity for stimulation of both CD4+ and CD8+ T cells was assessed using the commercially available pp65 and IE1 library and a newly designed IE2 peptide library. Relationships among the T cell populations were similar to prior results: pp65 promotes a substantial CD4 and CD8 response in over 70% of participants, while IE1 and IE2 are recognized less frequently and mainly in the CD8+ T cell compartment. MVA expressing the IEfusion antigen with or without the pp65 antigen was evaluated in PBMC from healthy volunteers to establish their recognition properties using a fully human system. The results showed that the memory T cell expansion stimulated by the rMVA for both the IEfusion and pp65 antigens, followed the proportions found ex vivo for the same volunteers using the peptide library approach. While there was substantial amplification of the relevant T cell populations, the stimulation did not skew the population towards a particular subset or antigen specificity. The data also confirms that the IEfusion protein is processed and presented appropriately to stimulate existing T cell populations in a manner that maintains the phenotypic distribution as expected in the ex vivo analysis. The most rigorous evaluation of the processing of the rMVA for T cell response is using PBMC from transplant patients. PBMC from HCT recipients in all three risk categories were evaluated and an equivalently strong recognition of both rMVAs was found. In some cases, it was even more vigorous than in the PBMC of healthy adults. No interference with the recognition of the IE antigen by the co-expressed pp65 antigen was found from the same rMVA, which further confirms that the recognition of both antigens can take place at the same time and derived from the same vector.

In one embodiment, the nucleic acid sequence encoding vaccinia mH5 promoter has a sequence containing nucleotides 3075-3168 of SEQ ID NO: A or 3022-3133 of SEQ ID NO: B Components of Chimeric Antigen Receptors A wide variety of CAR have been described in the scientific literature. In general CAR include an extracellular antigen-binding domain (often a scFv derived from variable heavy and light chains of an antibody), a spacer domain, a transmembrane domain and an intracellular signaling domain. The intracellular signaling domain usually includes the endodomain of a T cell co-stimulatory molecule (e.g., CD28, 4-11BB or OX-40) and the intracellular domain of CD3ζ.

Spacer Region

The CAR described herein can include a spacer region located between the cancer antigen targeting domain (e.g., a CD19 ScFv, e.g., the scFv portion can include the CD19 targeted scFv sequence of a CD19-targeted CAR such as that described in Wang et al. 2016 *Blood* 127:2980-2990) and the transmembrane domain. A variety of different spacer regions can be used. Some of them include at least portion of a human Fc region, for example a hinge portion of human Fc region or a CH3 domain or variants thereof. Table 1 below provides various spacers that can be used in the CARs described herein.

TABLE 1

Examples of Spacer Regions

| Name | Length | Sequence |
|---|---|---|
| a3 | 3 aa | AAA |
| linker | 10 aa | GGGSSGGGSG (SEQ ID NO: 2) |
| IgG4 hinge (S→P) (S228P) | 12 aa | ESKYGPPCPPCP (SEQ ID NO: 3) |
| IgG4 hinge | 12 aa | ESKYGPPCPSCP (SEQ ID NO: 4) |
| IgG4 hinge (S228P) + linker | 22 aa | ESKYGPPCPPCPGGGSSGGGSG (SEQ ID NO: 5) |
| CD28 hinge | 39 aa | IEVMYPPPYLDNEKSNGTIIHVKGKHL CPSPLFPGPSKP (SEQ ID NO: 6) |
| CD8 hinge-48 aa | 48 aa | AKPTTTPAPRPPTPAPTIASQPLSLRPE ACRPAAGGAVHTRGLDFACD (SEQ ID NO: 7) |
| CD8 hinge-45 aa | 45 aa | TTTPAPRPPTPAPTIASQPLSLRPEACR PAAGGAVHTRGLDFACD (SEQ ID NO: 8) |
| IgG4(HL-CH3) (includes S228P in hinge) | 129 aa | ESKYGPPCPPCPGGGSSGGGSGGQPR EPQVYTLPPSQEEMTKNQVSLTCLVK GFYPSDIAVEWESNGQPENNYKTTPP VLDSDGSFFLYSRLTVDKSRWQEGNV FSCSVMHEALHNHYTQKSLSLSLGK (SEQ ID NO: 9) |
| IgG4 (L235E, N297Q) | 229 aa | ESKYGPPCPSCPAPEFEGGPSVFLFPPK PKDTLMISRTPEVTCVVVDVSQEDPE VQFNWYVDGVEVHQAKTKPREEQFQ STYRVVSVLTVLHQDWLNGKEYKCK VSNKGLPSSIEKTISKAKGQPREPQVY TLPPSQEEMTKNQVSLTCLVKGFYPS |

TABLE 1-continued

Examples of Spacer Regions

| Name | Length | Sequence |
|---|---|---|
| | | DIAVEWESNGQPENNYKTTPPVLDSD GSFFLYSRLTVDKSRWQEGNVFSCSV MHEALHNHYTQKSLSLSLGK (SEQ ID NO: 10) |
| IgG4 (S228P, L235E, N297Q) | 229 aa | ESKYGPPCPPCPAPEFEGGPSVFLFPPK PKDTLMISRTPEVTCVVVDVSQEDPE VQFNWYVDGVEVHQAKTKPREEQFQ STYRVVSVLTVLHQDWLNGKEYKCK VSNKGLPSSIEKTISKAKGQPREPQVY TLPPSQEEMTKNQVSLTCLVKGFYPS DIAVEWESNGQPENNYKTTPPVLDSD GSFFLYSRLTVDKSRWQEGNVFSCSV MHEALHNHYTQKSLSLSLGK (SEQ ID NO: 11) |
| IgG4 (CH3) | 107 aa | GQPREPQVYTLPPSQEEMTKNQVSLT CLVKGFYPSDIAVEWESNGQPENNYK TTPPVLDSDGSFFLYSRLTVDKSRWQ EGNVFSCSVMHEALHNHYTQKSLSLS LGK (SEQ ID NO: 12) |

Some spacer regions include all or part of an immunoglobulin (e.g., IgG1, IgG2, IgG3, IgG4) hinge region, i.e., the sequence that falls between the CH1 and CH2 domains of an immunoglobulin, e.g., an IgG4 Fc hinge or a CD8 hinge. Some spacer regions include an immunoglobulin CH3 domain or both a CH3 domain and a CH2 domain. The immunoglobulin derived sequences can include one ore more amino acid modifications, for example, 1, 2, 3, 4 or 5 substitutions, e.g., substitutions that reduce off-target binding.

The spacer region can also comprise a IgG4 hinge region having the sequence ESKYGPPCPSCP (SEQ ID NO:4) or ESKYGPPCPPCP (SEQ ID NO:3).

The spacer region can also comprise the sequence ESKYGPPCPPCP (SEQ ID NO:3) followed by the linker sequence GGGSSGGGSG (SEQ ID NO:2) followed by IgG4 CH3 sequence GQPREPQVYTLPPSQEEMTKNQVSLTCLVKGFYPSDIAVEWESNGQPENNYKTTPPVLDSDGSFFLYSRLTVDKSRWQEGNVFSCSVMHEALHNHYTQKSLSLSLG K (SEQ ID NO:12). Thus, the entire spacer region can comprise the sequence: ESKYGPPCPPCPGGGSSGGGSGGQPREPQVYTLPPSQEEMTKNQVSLTCLVKGF YPSDIAVEWESNGQPENNYKTTPPVLDSDGSFFLYSRLTVDKSRWQEGNVFSCSVMHEALHNHYTQKSLSLSLGK (SEQ ID NO:11). In some cases, the spacer has 1, 2, 3, 4 or 5 single amino acid changes (e.g., conservative changes) compared to those shown in Table 1. In some cases, the IgG4 Fc hinge/linker region that is mutated at two positions (L235E; N297Q) in a manner that reduces binding by Fc receptors (FcRs).

Transmembrane Domain

A variety of transmembrane domains can be used in the. Table 2 includes examples of suitable transmembrane domains. Where a spacer region is present, the transmembrane domain is located carboxy terminal to the spacer region.

TABLE 2

Examples of Transmembrane Domains

| Name | Accession | Length | Sequence |
|---|---|---|---|
| CD3z | J04132.1 | 21 aa | LCYLLDGILFIYGVILTALFL (SEQ ID NO: 13) |
| CD28 | NM_006139 | 27 aa | FWVLVVVGGVLACYSLLVTVAFIIFWV (SEQ ID NO: 14) |
| CD28(M) | NM_006139 | 28 aa | MFWVLVVVGGVLACYSLLVTVAFIIFWV (SEQ ID NO: 15) |
| CD4 | M35160 | 22 aa | MALIVLGGVAGLLLFIGLGIFF (SEQ ID NO: 16) |
| CD8tm | NM_001768 | 21 aa | IYIWAPLAGTCGVLLLSLVIT (SEQ ID NO: 17) |
| CD8tm2 | NM_001768 | 23 aa | IYIWAPLAGTCGVLLLSLVITLY (SEQ ID NO: 18) |

TABLE 2-continued

Examples of Transmembrane Domains

| Name | Accession | Length | Sequence |
|---|---|---|---|
| CD8tm3 | NM_001768 | 24 aa | IYIWAPLAGTCGVLLLSLVITLYC (SEQ ID NO: 19) |
| 41BB | NM_001561 | 27 aa | IISFFLALTSTALLFLLFF LTLRFSVV (SEQ ID NO: 20) |

Costimulatory Domain

The costimulatory domain can be any domain that is suitable for use with a CD3ζ signaling domain. In some cases, the costimulatory domain is a CD28 costimulatory domain that includes a sequence that is at least 90%, at least 95%, at least 98% identical to or identical to: RSKRSR GGHSDYMNMTPRRPGPTRKHYQPYAPPRDFAAYRS (SEQ ID NO:23; LL to GG amino acid change double underlined). In some cases, the CD28 co-signaling domain has 1, 2, 3, 4 of 5 amino acid changes (preferably conservative and preferably not in the underlined GG sequence) compared to SEQ ID NO:23. In some cases the co-signaling domain is a 4-1BB co-signaling domain that includes a sequence that is at least 90%, at least 95%, at least 98% identical to or identical to: KRGRKKLLY-IFKQPFMRPVQTTQEEDGCSCRFPEEEEGGCEL (SEQ ID NO:24). In some cases, the 4-1BB co-signaling domain has 1, 2, 3, 4 of 5 amino acid changes (preferably conservative) compared to SEQ ID NO:24.

The costimulatory domain(s) are located between the transmembrane domain and the CD3ζ signaling domain. Table 3 includes examples of suitable costimulatory domains together with the sequence of the CD3ζ signaling domain.

fications. In certain embodiments, a 4-1BB costimulatory domain or a variant thereof having 1-5 (e.g., 1 or 2) amino acid modifications in present. In some embodiments there are two costimulatory domains, for example a CD28 co-stimulatory domain or a variant thereof having 1-5 (e.g., 1 or 2) amino acid modifications (e.g., substitutions) and a 4-1BB co-stimulatory domain or a variant thereof having 1-5 (e.g., 1 or 2) amino acid modifications (e.g., substitutions). In various embodiments the 1-5 (e.g., 1 or 2) amino acid modification are substitutions. The costimulatory domain is amino terminal to the CD3ζ signaling domain and in some cases a short linker consisting of 2-10, e.g., 3 amino acids (e.g., GGG) is positioned between the costimulatory domain and the CD3ζ signaling domain.

CD3K Signaling Domain

The CD3ζ Signaling domain can be any domain that is suitable for use with a CD3ζ signaling domain. In some cases, the CD3ζ signaling domain includes a sequence that is at least 90%, at least 95%, at least 98% identical to or identical to: RVKFSRSADAPAYQQGQNQLYNELNLGR-REEYDVLDKRRGRDPEMGGKPRR KNPQEGLY-NELQKDKMAEAYSEIGMKGERRRGKGHDGLYQGL-STATKDTYD ALHMQALPPR (SEQ ID NO:21). In some

TABLE 3

CD32 Domain and Examples of Costimulatory Domains

| Name | Accession | Length | Sequence |
|---|---|---|---|
| CD3 | J04132.1 | 113 aa | RVKFSRSADAPAYQQGQNQLYNELNLGR REEYDVLDKRRGRDPEMGGKPRRKNPQ EGLYNELQKDKMAEAYSEIGMKGERRR GKGHDGLYQGLSTATKDTYDALHMQAL PPR (SEQ ID NO: 21) |
| CD28 | NM_006139 | 42 aa | RSKRSRLLHSDYMNMTPRRPGPTRKHYQ PYAPPRDFAAYRS (SEQ ID NO: 22) |
| CD28gg* | NM_006139 | 42 aa | RSKRSRGGHSDYMNMTPRRPGPTRKHY QPYAPPRDFAAYRS (SEQ ID NO: 23) |
| 41BB | NM_001561 | 42 aa | KRGRKKLLYIFKQPFMRPVQTTQEEDGC SCRFPEEEEGGCEL (SEQ ID NO: 24) |
| OX40 | | 42 aa | ALYLLRRDQRLPPDAHKPPGGGSFRTPIQ EEQADAHSTLAKI (SEQ ID NO: 25) |

In various embodiments: the costimulatory domain is selected from the group consisting of: a costimulatory domain depicted in Table 3 or a variant thereof having 1-5 (e.g., 1 or 2) amino acid modifications, a CD28 costimulatory domain or a variant thereof having 1-5 (e.g., 1 or 2) amino acid modifications, a 4-1BB costimulatory domain or a variant thereof having 1-5 (e.g., 1 or 2) amino acid modifications and an OX40 costimulatory domain or a variant thereof having 1-5 (e.g., 1 or 2) amino acid modicases, the CD3 ζ signaling has 1, 2, 3, 4 of 5 amino acid changes (preferably conservative) compared to SEQ ID NO:21.

Truncated EGFR

The CD3ζ signaling domain can be followed by a ribosomal skip sequence (e.g., LEGGGEGRGSLLTCGD-VEENPGPR; SEQ ID NO:27) and a truncated EGFR having a sequence that is at least 90%, at least 95%, at least 98% identical to or identical to:

(SEQ ID NO: 28)
LVTSLLLCELPHPAFLLIPRKVCNGIGIGEFKDSLSINATNIKHFKNCT

SISGDLHILPVAFRGDSFTHTPPLDPQELDILKTVKEITGFLLIQAWPE

NRTDLHAFENLEIIRGRTKQHGQFSLAVVSLNITSLGLRSLKEISDGDV

IISGNKNLCYANTINWKKLFGTSGQKTKIISNRGENSCKATGQVCHALC

SPEGCWGPEPRDCVSCRNVSRGRECVDKCNLLEGEPREFVENSECIQCH

PECLPQAMNITCTGRGPDNCIQCAHYIDGPHCVKTCPAGVMGENNTLVW

KYADAGHVCHLCHPNCTYGCTGPGLEGCPTNGPKIPSIATGMVGALLLL

LVVALGIGLFM.

In some cases, the truncated EGFR has 1, 2, 3, 4 of 5 amino acid changes (preferably conservative) compared to SEQ ID NO:28.

Example 1: Enrichment of CMV-Specific T Cells from PBMC of Healthy Donors after Stimulation with cGMP Grade CMVpp65 Protein CMV-specific T cells were prepared from PBMC of healthy donors by stimulating the PBMC with cGMP grade CMVpp65 protein. Briefly, PBMCs were isolated by density gradient centrifugation over Ficoll-Paque (Pharmacia Biotech, Piscataway, NJ) from peripheral blood of consented healthy, HLA-A2 CMV-immune donors under a City of Hope Internal Review Board-approved protocol. PBMC were frozen for later use. After overnight rest in RPMI medium containing 5% Human AB serum (Gemini Bio Products) without cytokine, the PBMC were stimulated with current good manufacturing practice (cGMP) grade CMVpp65 protein (Miltenyi Biotec, Germany) at 10 ul/10× $10^6$ cells for 16 hours in RPMI 1640 (Irvine Scientific, Santa Ana, CA) supplemented with 2 mM L-glutamine (Irvine Scientific), 25 mM N-2-hydroxyethylpiperazine-N-2-ethanesulfonic acid (HEPES, Irvine Scientific), 100 U/mL penicillin, 0.1 mg/mL streptomycin (Irvine Scientific) in the presence of 5 U/ml IL-2 and 10% human AB serum. CMV-specific T cells were selected using the IFNγ capture (Miltenyi Biotec, Germany) technique according to the manufacturer's instructions.

To demonstrate the consistency of this clinically feasible process, the selection was repeated five times using PBMC from three different donors. IFNγ-positive T cells were consistently enriched from a baseline mean of 3.8% (range 1.8-5.6) to a post-capture mean of 71.8% (range 61-81) and contained polyclonal CD8+(34%) and CD4+ T cells (37%) after selection (FIG. 1A and FIG. 1C). Moreover, the selected CMV-specific T cells included both CD4 and CD8 subsets and represented the entire spectrum of CMV-specificity, showing responsiveness to CMVpp65 pepmix stimulation with broad recognition.

Example 2: Genetic Modification of Enriched CMV-Specific T Cells to Express CD19 CAR and In Vitro Expansion of the CMV/CAR T Cells In the clinically adaptable procedure, IFNγ-captured CMV-specific T cells were transduced 2 days after the selection, without OKT3 activation, using the second generation CD19RCD28EGFRt lentiviral construct containing the IgG4 Fc hinge region mutations (L235E; N297Q) that improve potency due to distortion of the FcR binding domain. The complete amino sequence of the this CD19 CAR is depicted in FIGS. 3A-3C. Starting seven days post lenti-transduction, the cells were stimulated on a weekly basis with 8000 cGy-irradiated, CD19-expressing NIH3T3 cells at a 1:10 ratio (T cells:CD19NIH 3T3). The percentage of CAR+ cells detected by cetuximab increased from 8% post transduction to 46% after 2 rounds of stimulation with a 120-150-fold total cell increase (FIG. 1B and FIG. 1D). Further details regarding the lentiviral construct, the CD19-expressing NIH3T3 cells and other materials and techniques used in the studies described herein are presented below.

Figure 2B:
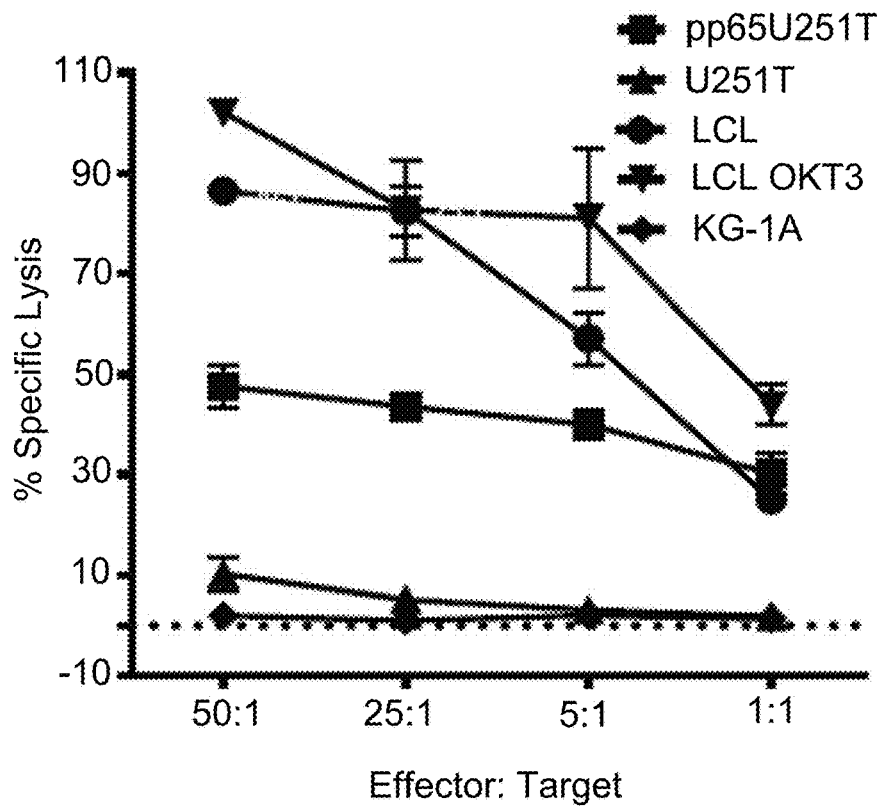
Figure 2C:
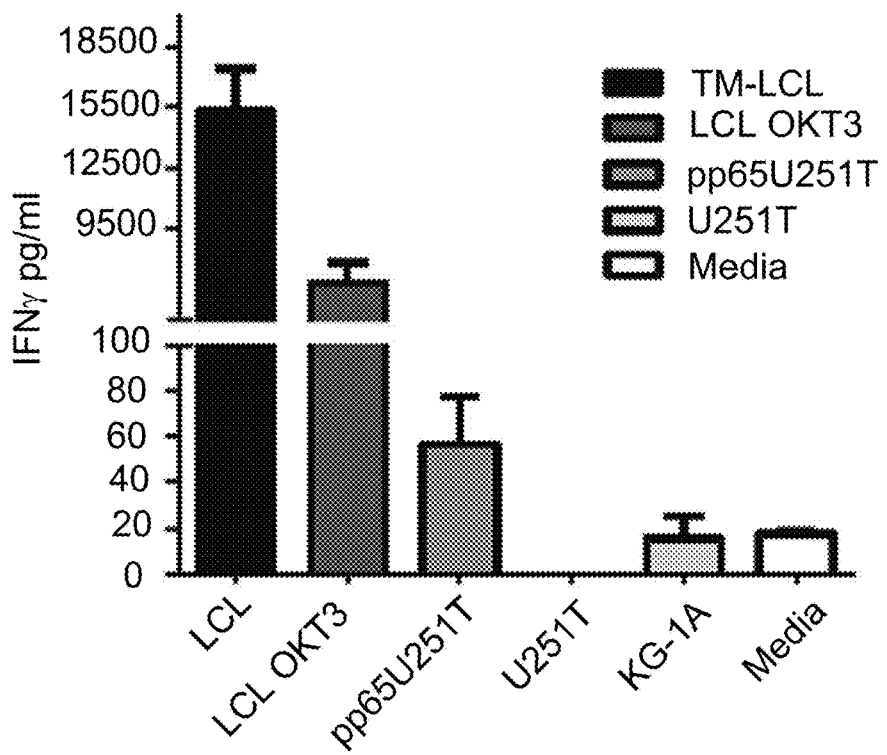
Figure 2D:
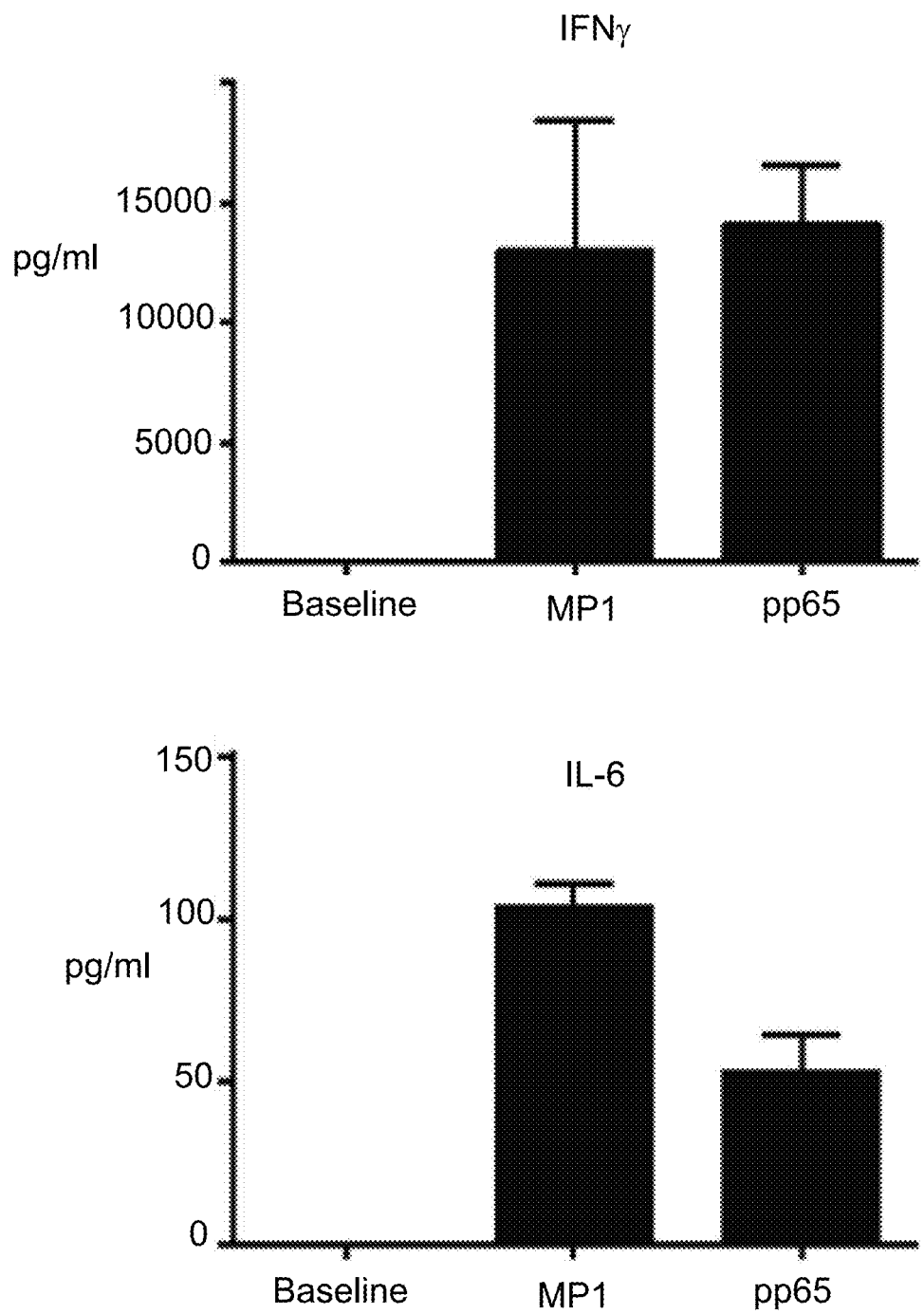
FIG. 2D depicts the results of studies examining cytokine levels in the serum of CMV/CAR T cell treated tumor bearing mice. NSG mice were injected i.v. on day 0 with 2.5×106 GFPffluc+ LCL cells. Three days after tumor inoculation, recipient mice were administered i.v. with 2×106 CMV/CAR cells that underwent 2 rounds of CD19 stimulation. Vaccine was given by i.v. injection of peptide (pp65 or MP1) pulsed autologous T cells on day 14. Thirteen days post vaccine, serum of recipient mice was collected and levels of human cytokines were determined by cytometric bead array. Cytokine levels in the serum of untreated mice was used as baseline. Mean and SEMs from triplicates are presented.

Example 3: CMV/CAR T Cells Exhibited Specific Effector Function after Stimulation Through Pre-Defined Viral TCR and CD19CAR Recapitulating our previous studies (23), the ex vivo expanded CMV-specific T cells possessed an effector phenotype and no longer expressed the central memory markers of the originally selected cells, such as CD62L, CD28, and IL-7Ra (FIG. 2A and FIG. 2D). However, levels of CD27 remained high, suggesting a greater proliferative potential that has been associated with greater clinical efficacy (24). To investigate CMV/CAR T cell effector function via signaling by both the endogenous CMV-specific TCR and the introduced CD19CAR, we evaluated response to engineered pp65-expressing U251T cells from HLA-A2 donors, and also allogeneic CD19+ LCLs, based on cytotoxicity, cytokine production and proliferation profiles. As expected, the expanded CMV/CAR T cells specifically lysed CD19+ LCLs with the same maximum killing levels as the OKT3-expressing LCL used as positive controls. Likewise, specific killing was also observed when pp65U251T cells were used as targets as compared to parental U251T cells (FIG. 2B). Accordingly, after overnight stimulation, elevated IFNγ secretion was observed after either CD19 or pp65 antigen stimulation as compared to antigen-negative stimulators such as KG1a and U251T parental cells (FIG. 2C).

Antibodies and Flow Cytometry: Fluorochrome-conjugated isotype controls, anti-CD3, anti-CD4, anti-CD8, anti-CD28, anti-CD45, anti-CD27, anti-CD62L, anti-CD127, anti-IFN☐, and streptavidin were obtained from BD Biosciences. Biotinylated cetuximab was generated from cetuximab purchased from the City of Hope pharmacy. The IFN-Q Secretion Assay—Cell Enrichment and Detection Kit and CMVpp65 protein were purchased from Miltenyi Biotec (Miltenyi Biotec, Germany). Phycoerythrin (PE)-conjugated CMV pp65 (NLVPMVATV)-HLA-A2*0201 iTAg MHC tetramer, PE-conjugated multi-allele negative tetramer was obtained from Beckman Coulter (Fullerton, CA). Carboxyfluorescein diacetate succinimidyl ester (CFSE) was purchased from Invitrogen (Carlsbad, CA). All monoclonal antibodies, tetramers and CFSE were used according to the manufacturer's instructions. Flow cytometry data acquisition was performed on a MACSQuant (Miltenyi Biotec, Germany) or FACScalibur (BD Biosciences), and the percentage of cells in a region of analysis was calculated using FCS Express V3 (De Novo Software).

Cell lines: EBV-transformed lymphoblastoid cell lines (LCLs) were made from peripheral blood mononuclear cells (PBMC) as previously described (16). To generate LCL-OKT3, allogeneic LCLs were resuspended in nucleofection solution using the Amaxa Nucleofector kit T, OKT3-2A-Hygromycin_pEK plasmid was added to 5 μg/107 cells, the cells were electroporated using the Amaxa Nucleofector I, and the resulting cells were grown in RPMI 1640 with 10% FCS containing 0.4 mg/ml hygromycin. To generate firefly luciferase+ GFP+ LCLs (fflucGFPLCLs), LCLs were transduced with lentiviral vector encoding eGFP-ffluc. Initial transduction efficiency was 48.5%, so the GFP+ cells were sorted by FACS for >98% purity. To generate CD19 NIH3T3 cells, parental NIH3T3 cells (ATCC) were transduced with a retrovirus encoding CD80, CD54 and CD58 (17). The established cell line was further engineered to express CD19GFP by lentiviral transduction. GFP+ cells were purified by FACS sorting and expanded for the use of stimulation of CMV/CAR T cells. To generate pp65 stimulator cells, U251T cells derived from human glioblastoma cells from an HLA A2 donor (ATCC) were transduced with a lentiviral vector encoding full length pp65 fused to green fluorescent protein (GFP). pp65U251T cells were purified by GFP expression using flow cytometry. Banks of all cell lines were authenticated for the desired antigen/marker expression by flow cytometry prior to cryopreservation, and thawed cells were cultured for less than 6 months prior to use in assays.

Peptides: The pp65 peptide NLVPMVATV (HLA-A 0201 CMVpp65) at >90% purity was synthesized using automated solid phase peptide synthesis in (Department of Experimental Therapeutics, Beckman Research Institute of City of Hope). MP1 GIGFVFTL peptide (HLA-A 0201 influenza) was synthesized at the City of Hope DNA/RNA Peptide Synthesis Facility, (Duarte, CA). pepMix HCMVA (pp65) (pp65pepmix) was purchased from JPT peptide Technologies (GmbH, Berlin Germany). All peptides were used according to the manufacturer's instructions.

Lentivirus vector construction: The lentivirus CAR construct was modified from the previously described CD19-specific scFvFc:(chimeric immunoreceptor(18), to create a third-generation vector. The CD19CAR containing a CD28Q co-stimulatory domain carries mutations at two sites (L235E; N297Q) within the CH2 region on the IgG4-Fc spacers to ensure enhanced potency and persistence after adoptive transfer (FIG. 7). The lentiviral vector also expressed a truncated human epidermal growth factor receptor (huEGFRt), which includes a cetuximab (Erbitux™) binding domain but excludes the EGF-ligand binding and cytoplasmic signaling domains. A T2A ribosome skip sequence links the codon-optimized CD19R:CD28:(sequence to the huEGFRt sequence, resulting in coordinate expression of both CD19R:CD28:(and EGFRt from a single transcript (CD19CARCD28EGFRt) (19). The CD19RCD28EGFRt DNA sequence (optimized by GeneArt) was then cloned into a self-inactivating (SIN) lentiviral vector pHIV7 (gift from Jiing-Kuan Yee, Beckman Research Institute of City of Hope) in which the CMV promoter was replaced by the EF-1α promoter.

Enrichment of CMV-specific T cells after CMVpp65 protein stimulation: PBMCs were isolated by density gradient centrifugation over Ficoll-Paque (Pharmacia Biotech, Piscataway, NJ) from peripheral blood of consented healthy, HLA-A2 CMV-immune donors under a City of Hope Internal Review Board-approved protocol. PBMC were frozen for later use. After overnight rest in RPMI medium containing 5% Human AB serum (Gemini Bio Products) without cytokine, the PBMC were stimulated with current good manufacturing practice (cGMP) grade CMVpp65 protein (Miltenyi Biotec, Germany) at 10 μl/10×10$^6$ cells for 16 hours in RPMI 1640 (Irvine Scientific, Santa Ana, CA) supplemented with 2 mM L-glutamine (Irvine Scientific), 25 mM N-2-hydroxyethylpiperazine-N'-2-ethanesulfonic acid (HEPES, Irvine Scientific), 100 U/mL penicillin, 0.1 mg/mL streptomycin (Irvine Scientific) in the presence of 5 U/ml IL-2 and 10% human AB serum. CMV-specific T cells were selected using the IFNγ capture (Miltenyi Biotec, Germany) technique according to the manufacturer's instructions.

Derivation and expansion of CMV/CAR T cells: The selected CMV-specific T cells were transduced on day 2 post IFNγ capture with lentiviral vector expressing CD19CARCD28EGFRt at MOI 3. Seven to ten days after lenti-transduction, the CMV/CAR T cells were expanded by stimulation through CAR-mediated activation signals using 8000 cGy-irradiated CD19-expressing NIH 3T3 cells at a 10:1 ratio (T cells:CD19 NIH3T3) once a week as described (17) in the presence of IL-2 50U/ml and IL-15 1 ng/ml. After 2 rounds of expansion, the growth and functionality of the CMV/CAR T cells was evaluated in vitro and in vivo.

Intracellular cytokine staining: CMV/CAR T cells (10$^5$) were activated overnight with 10$^5$ LCL-OKT3, LCL, or KG1a cells in 96-well tissue culture plates, and with 10$^5$ U251T and engineered pp65-expressing U251T cells (pp65U251T) in 24-well tissue culture plates in the presence of Brefeldin A (BD Biosciences). The cell mixture was then stained using anti-CD8, cetuximab and streptavidin, and pp65Tetramer to analyze surface co-expression of CD8, CAR and CMV-specific TCR, respectively. Cells were then fixed and permeabilized using the BD Cytofix/Cytoperm kit (BD Biosciences). After fixation, the T cells were stained with an anti-IFNγ.

CFSE Proliferation assays: CMV/CAR T cells were labeled with 0.5 μM CFSE and co-cultured with stimulator cells LCL-OKT3, LCLs, and pp65 U251T for 8 days. Co-cultures with U251T and KG1a cells were used as negative controls. Proliferation of CD3- and CAR-positive populations was determined using multicolor flow cytometry.

Cytokine production assays: T cells (10$^5$) were co-cultured overnight in 96-well tissue culture plates with 105 LCL-OKT3, LCL, or KG1a cells and in 24-well tissue culture plates with 105 U251T and engineered pp65-expressing U251T cells. Supernatants were then analyzed by cytometric bead array using the Bio-Plex Human Cytokine 17-Plex Panel (Bio-Rad Laboratories) according to the manufacturer's instructions.

Cytotoxicity assays: 4-hour chromium-release assays (CRA) were performed as previously described (20) using effector cells that had been harvested directly after 2 rounds of CD19 Ag stimulations.

What is claimed is:

1. A method for treating a patient suffering from lymphoma expressing CD19 comprising:
   (a) providing a composition comprising a population of T cells expressing both a chimeric antigen receptor (CAR) targeted to CD19 and a T cell receptor that binds a cytomegalovirus (CMV) antigen pp65;
   (b) administering the composition of part (a) to the patient; and
   (c) administering to the patient a viral vector encoding:
       (i) CMV pp65 and
       (ii) a fusion protein comprising exon 4 of CMV protein IE1 (e4) and exon 5 of CMV protein IE2 (e5).

2. The method of claim 1, wherein the viral vector of part (c) is a MVA virus.

3. The method of claim 2, wherein expression of (i) CMV pp65 and (ii) the fusion protein comprising exon 4 of CMV protein IE1 (e4) and exon 5 of CMV protein IE2 (e5) is under the control of mH5 promoter.

4. The method of claim 1, wherein the patient is CMV-seronegative prior to treatment.

5. The method of claim 1, wherein the patient is CMV-seropositive prior to treatment.

6. The method of claim 1, wherein the viral vector is administered to the patient both prior to and subsequent to the administration of the composition comprising a population of T cells.

7. The method of claim 1, wherein the step of providing a population of T cells expressing a CAR and a T cell receptor that binds a CMV antigen comprises:
   (a1) providing PBMC or a T cell subpopulation from a CMV-seropositive human donor;
   (a2) exposing the PBMC or the T cell subpopulation of part (a1) to at least one CMV antigen;
   (a3) treating the exposed cells of part (a2) to produce a population of cells enriched for cells expressing a T cell receptor that bind a CMV antigen; and
   (a4) transducing at least a portion of the enriched population of cells of part (a3) with a vector expressing a CAR.

8. The method of claim 7, wherein the step of treating the exposed cells to produce a population of cells enriched for cells expressing a T cell receptor that binds a CMV antigen comprises treating the cells to produce a population of cells enriched for cells expressing an activation marker.

9. The method of claim 1, wherein the step of providing a population of T cell expressing a CAR and a T cell receptor that binds a CMV antigen further comprises:
   (a1) administering a viral vector encoding: (i) CMV pp65 and (ii) a fusion protein comprising exon 4 of CMV protein IE1 (e4) and exon 5 of CMV protein IE2 (e5) to a human donor to convert a CMV-seronegative human donor to one containing T cells responsive to CMV antigens pp65, IE1 and IE2;
   (a2) obtaining PBMC from the CMV-seropositive human donor of (a1);
   (a3) exposing the PBMC of (a2) to at least one CMV antigen;
   (a4) treating the exposed cells of (a3) to produce a population of cells enriched for stimulated cells expressing a T cell receptor that binds a CMV antigen; and
   (a5) transducing at least a portion of the enriched population of cells of (a4) with a vector expressing a CAR, thereby providing a population of T cell expressing a CAR and a T cell receptor that binds a CMV antigen.

10. The method of claim 1, wherein the step of providing a population of T cell expressing a CAR and a T cell receptor that binds a CMV antigen comprises:
   (a1) administering a viral vector encoding: (i) CMV pp65 and (ii) a fusion protein comprising exon 4 of CMV protein IE1 (e4) and exon 5 of CMV protein IE2 (e5) to a CMV-positive human donor;
   (a2) obtaining PBMC from the CMV-seropositive human donor of (a1);
   (a3) exposing the PBMC of (a2) to at least one CMV antigen;
   (a4) treating the exposed cells of (a3) to produce a population of cells enriched for stimulated cells expressing a T cell receptor that binds a CMV antigen;

(a5) transducing at least a portion of the enriched population of cells of (a4) with a vector expressing a CAR, thereby providing a population of T cell expressing a CAR and a T cell receptor that binds a CMV antigen.

\* \* \* \* \*